（12）United States Patent
Tavshikar

(10) Patent No.: US 12,230,148 B2
(45) Date of Patent: Feb. 18, 2025

(54) ARTIFICIAL INTELLIGENCE SYSTEM FOR ESTIMATING EXCESS NON-SAPIENT PAYLOAD CAPACITY ON MIXED-PAYLOAD AERONAUTIC EXCURSIONS

(71) Applicant: QuantumiD Technologies Inc., Cambridge, MA (US)

(72) Inventor: Milind Tavshikar, Lexington, MA (US)

(73) Assignee: QuantumID Technologies Inc., Cambridge, MA (US)

( * ) Notice: Subject to any disclaimer, the term of this patent is extended or adjusted under 35 U.S.C. 154(b) by 265 days.

(21) Appl. No.: 17/882,301

(22) Filed: Aug. 5, 2022

(65) Prior Publication Data

US 2022/0383757 A1  Dec. 1, 2022

Related U.S. Application Data

(63) Continuation-in-part of application No. 16/850,910, filed on Apr. 16, 2020, now Pat. No. 11,410,058,
(Continued)

(51) Int. Cl.
*G08G 5/00* (2006.01)

(52) U.S. Cl.
CPC ......... *G08G 5/0034* (2013.01); *G08G 5/0047* (2013.01)

(58) Field of Classification Search
CPC .. G08G 5/0034; G08G 5/0047; G08G 5/0013; G08G 5/0026; G08G 5/0039;
(Continued)

(56) References Cited

U.S. PATENT DOCUMENTS 7,430,518 B2   9/2008   Gliozzi et al.
7,840,429 B2   11/2010  Benda et al.
(Continued)

FOREIGN PATENT DOCUMENTS

WO   2017217872   12/2017

OTHER PUBLICATIONS

Pun, et al., Air Cargo Allotment Planning, Dec. 31, 2010, Industrial Engineering and Management Sciences, Northwestern University.
(Continued)

*Primary Examiner* — Alan D Hutchinson
(74) *Attorney, Agent, or Firm* — Caldwell Intellectual Property Law

(57) ABSTRACT

A system for selection of physical asset transfer paths using mixed-payload aeronautic excursions includes a client-interface module operating on at least a server, the client-interface module, configured to receive an initial location, a terminal location, and a description of at least an element of non-sapient payload, a path-selection module operating on the at least a server configured to identify at least an aeronautic path from the initial location to the terminal location and a plurality of aeronautic excursions traversing the at least an aeronautic path and select an aeronautic excursion of the plurality of aeronautic excursions based on a plurality of excess non-sapient payload storage estimations corresponding the plurality of aeronautic excursions, and a capacity estimation artificial intelligence module operating on the at least a server, the capacity estimation artificial intelligence module designed and configured to generate the plurality of excess non-sapient payload storage estimations.

18 Claims, 19 Drawing Sheets

Related U.S. Application Data which is a continuation-in-part of application No. 16/369,892, filed on Mar. 29, 2019, now Pat. No. 10,661,902.

(60) Provisional application No. 62/835,048, filed on Apr. 17, 2019.

(58) Field of Classification Search
CPC ........ G08G 5/0052; G06N 3/084; G06N 3/09; G06N 3/0464; G06Q 10/047; G06Q 10/067; G06Q 10/08355; G06Q 10/087; G06Q 50/40
See application file for complete search history.

(56) References Cited

U.S. PATENT DOCUMENTS

| | | |
|---|---|---|
| 8,622,298 B2 | 1/2014 | Huber |
| 8,768,608 B2 | 7/2014 | Scherenberger et al. |
| 8,952,813 B2 | 2/2015 | Boss et al. |
| 9,865,101 B2 | 1/2018 | Amirapu |
| 9,869,574 B2 | 1/2018 | Nicks |
| 10,053,228 B2 | 8/2018 | Kahn et al. |
| 2006/0015396 A1 | 1/2006 | Blomeyer |
| 2013/0132128 A1 | 5/2013 | Fox et al. |
| 2013/0159205 A1 | 6/2013 | Schnoerwangen et al. |
| 2015/0219512 A1 | 8/2015 | Bruti |
| 2015/0241209 A1 | 8/2015 | Jouper et al. |
| 2016/0117536 A1 | 4/2016 | Johnsen |
| 2017/0045394 A1 | 2/2017 | Fuss et al. |
| 2017/0283085 A1 | 10/2017 | Kearns et al. |
| 2017/0323239 A1* | 11/2017 | Johnson ........... G06Q 10/06313 |
| 2017/0351255 A1 | 12/2017 | Anderson et al. |
| 2018/0060808 A1 | 3/2018 | Borgerson et al. |
| 2018/0209837 A1 | 7/2018 | Golshany et al. |
| 2018/0268100 A1 | 9/2018 | Ren et al. |
| 2018/0268288 A1 | 9/2018 | Vandike et al. |

OTHER PUBLICATIONS

Koev, Transmetrics: The Startup That Helps Cargo Companies Stop Shipping Air, Interview, Sep. 21, 2018.

Lau, et al., Development of a Profit-Based Air Cargo Loading Information System, Journal, Nov. 30, 2006, vol. 2 Issue: 4, IEEE Transactions on Industrial Informatics.

Azadian, Farshid, Alper E. Murat, and Ratna Babu Chinnam. "Dynamic routing of time-senitive air cargo using real-time information." Transportation Research Part E: Logistics and Transportation Review 48.1 (2012): 355-372. (Year: 2012).

* cited by examiner

ARTIFICIAL INTELLIGENCE SYSTEM FOR ESTIMATING EXCESS NON-SAPIENT PAYLOAD CAPACITY ON MIXED-PAYLOAD AERONAUTIC EXCURSIONS

CROSS-REFERENCE TO RELATED APPLICATIONS

This application is a continuation-in-part of Non-provisional application Ser. No. 16/850,910 filed on Apr. 16, 2020, and entitled "ARTIFICIAL INTELLIGENCE SYSTEM FOR ESTIMATING EXCESS NON-SAPIENT PAYLOAD CAPACITY ON MIXED-PAYLOAD AERONAUTIC EXCURSIONS," which is a continuation-in-part of Non-provisional application Ser. No. 16/369,892 filed on Mar. 29, 2019, and entitled "ARTIFICIAL INTELLIGENCE SYSTEM FOR ESTIMATING EXCESS NON-SAPIENT PAYLOAD CAPACITY ON MIXED-PAYLOAD AERONAUTIC EXCURSIONS. Non-provisional application Ser. No. 16/850,910 further claims the benefit of priority of U.S. Provisional Patent Application Ser. No. 62/835,048, filed on Apr. 17, 2019, and titled "ARTIFICIAL INTELLIGENCE SYSTEM FOR ESTIMATING EXCESS NON-SAPIENT PAYLOAD CAPACITY ON MIXED-PAYLOAD AERONAUTIC EXCURSIONS," each of which are incorporated by reference herein in their entirety.

FIELD OF THE INVENTION

The present invention generally relates to the field of artificial intelligence. In particular, the present invention is directed to a system for aeronautic path optimization and a method for its use.

BACKGROUND

Mixed-payload aeronautic excursions frequently carry different classes of payload in different sections or components of aircraft. Where sapient payload is combined with associated non-sapient payload, a section for the latter may be left with excess capacity, which could be used to store additional non-sapient payload. However, this excess capacity is difficult to predict and existing systems for such estimation are inaccurate.

SUMMARY OF THE DISCLOSURE

In an aspect, A system for aeronautic path optimization is disclosed. The system comprises at least a server. At least a server is configured to receive at least an order, wherein the order comprises data regarding the physical transport of a non-sapient payload from an initial location to a terminal location. The server may also be configured to identify an aeronautic path as a function of the at least an order using a path selection module, wherein the aeronautic path comprises travel between the initial location and the terminal location. The server may generate a plurality of optimal routes for the at least an order as a function of the aeronautic path. The server, produces an assigned route as a function the plurality of optimal routes.

In another aspect, a method of use for aeronautic path optimization is disclosed. The method comprises receiving, using at least a server, at least an order, wherein the order comprises data regarding the physical transport of a non-sapient payload from an initial location to a terminal location. The method additionally comprises identifying, using the at least a server, an aeronautic path as a function of the at least an order using a path selection module, wherein the aeronautic path comprises travel between the initial location and the terminal location. The method generates using the at least a server, a plurality of optimal routes for the at least an order as a function of the produces, using the at least a server, an assigned route as a function of the plurality of optimal routes.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

Embodiments of disclosed systems and methods use artificial intelligence to generate modules that determine excess non-sapient payload capacity in mixed-payload aeronautic excursions. Resulting determinations may be used to estimate excess non-sapient payload capacity on future mixed-payload aeronautic excursions. Data used to perform learning algorithms may be provided in one or more databases, received via data feeds from operators, airports, and/or weather services. Estimations may continually update in response to updated data.

Figure 1:
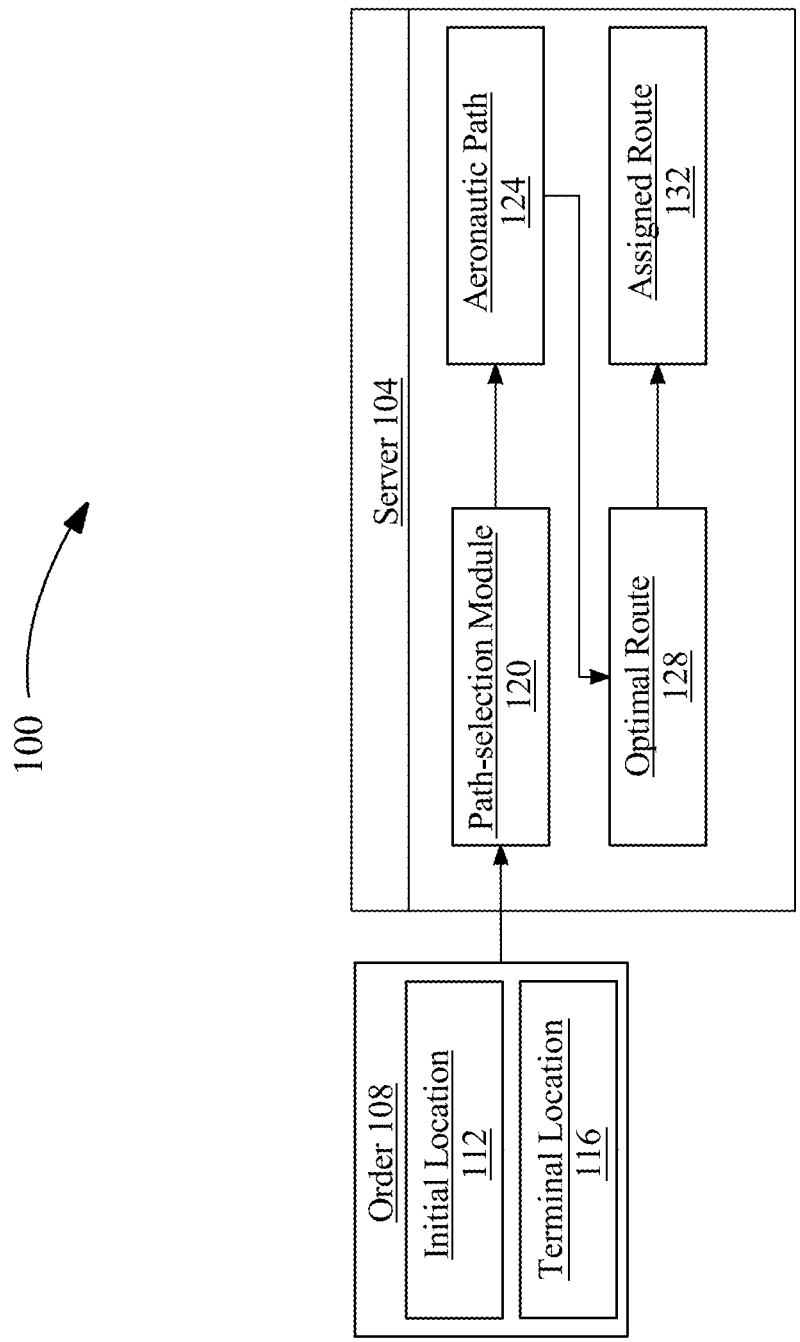
FIG. 1 is a block diagram illustrating an exemplary embodiment of a system for aeronautic path optimization.

Referring to FIG. 1, an exemplary embodiment of a system 100 for selection of physical asset transfer paths using mixed-payload aeronautic excursions. System 100 includes at least a server 104. At least a server 104 may include any computing device as described below in reference to FIG. 19, including without limitation a microcontroller, microprocessor, digital signal processor (DSP) and/or system on a chip (SoC) as described below in reference to FIG. 19. At least a server 104 may be housed with, may be incorporated in, or may incorporate one or more sensors of at least a sensor. Computing device may include, be included in, and/or communicate with a mobile device such as a mobile telephone or smartphone. At least a server 104 may include a single computing device operating independently, or may include two or more computing device operating in concert, in parallel, sequentially or the like; two or more computing devices may be included together in a single computing device or in two or more computing devices. At least a server 104 with one or more additional devices as described below in further detail via a network interface device. Network interface device may be utilized for connecting a at least a server 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. At least a server 104 may include but is not limited to, for example, a at least a server 104 or cluster of computing devices in a first location and a second computing device or cluster of computing devices in a second location. At least a server 104 may include one or more computing devices dedicated to data storage, security, distribution of traffic for load balancing, and the like. At least a server 104 may distribute one or more computing tasks as described below across a plurality of computing devices of computing device, which may operate in parallel, in series, redundantly, or in any other manner used for distribution of tasks or memory between computing devices. At least a server 104 may be implemented using a "shared nothing" architecture in which data is cached at the worker, in an embodiment, this may enable scalability of system 100 and/or computing device.

At least a server 104 may be designed and/or configured to perform any method, method step, or sequence of method steps in any embodiment described in this disclosure, in any order and with any degree of repetition. For instance, at least a server 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. At least a server 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, a server 104 may be configured to receive an order 108. As used in the current disclosure, an "order" is element of data regarding the physical transfer of a non-sapient payload from an initial location to a terminal location. As used in the current disclosure, a "non-sapient payload" is any non-human cargo to be delivered. Examples of non-sapient payload may include goods, food, household items, clothing, footwear, jewelry, office supplies, cleaning supplies, industrial supplies, groceries, and the like. Non-sapient payload may be consistent with any package that may be delivered through the United States Postal Service. Non-sapient payload may also be consistent with packages that may be delivered through services like UPS, FedEx, DHL, Amazon, Door Dash, Postmates, Uber, Uber Eats, Lyft, and the like. An order may include both sapient payloads and non-sapient payloads. Sapient payload may include a number of persons transported on the aircraft besides flight crew such as pilots, co-pilots, flight attendants, security personnel, or the like; sapient payload may include, for instance, patients being transported for medical purposes. Sapient payload may include prisoners being transported from one facility to another. Sapient payload may include one or more persons that have arranged to travel on an aircraft for an aeronautic excursion; one or more persons may be travelling for business, pleasure, governmental functions, or the like. One or more persons may include one or more persons that have obtained a right of passage on the aircraft for the aeronautic excursion by remunerative means, for instance by providing currency, electronic payment, drafts, or the like to an operator of the aircraft; one or more persons may be passengers. Non-sapient payload may include a quantity or number of elements of payload, as defined above, that are not sapient payload. For instance, and without limitation, non-sapient payload may include inanimate objects, non-human living organisms such as animals, plants, or the like, materials such as construction materials, or any other item or items of payload that may be transported on an aircraft for an aeronautic excursion. Non-sapient payload may be expressed as a number of items, a volume occupied by a single item or in the aggregate by a plurality of items including without limitation the set of all items to be transported on the aircraft for at least a portion of the aeronautic excursion, a weight of a single item, a weight of a plurality of items including without limitation the set of all items to be transported on the aircraft for at least a portion of the aeronautic excursion, or any combination thereof. Non-limiting examples of non-sapient payload may include elements of non-sapient payload carried by one or more persons making up sapient payload, including without limitation suitcases, "carry-on" bags, backpacks, parcels, crates, chests, or the like and/or one or more elements of freight as described in further detail below.

With continued reference to FIG. 1, an order 108 may comprise data regarding an initial location 112 and a terminal location 116. As used in the current disclosure, a "initial location" is the place of departure for the non-sapient payload. As used in the current disclosure a "place of departure" is the original location of the non-sapient payload within the system. As used in the current disclosure, a "terminal location" is the final destination for the non-sapient payload. In a non-limiting example, an initial location and a terminal location may comprise a business, residence, warehouse, factory, and the like. In an embodiment, an order may be received from a user. For instance, and without limitation, a user may be a person who wishes to send an item, which may include without limitation a parcel, shipment of goods, or shipment of products from a residence, business, factory, warehouse, or the like at initial location 112 to a residence, business, factory, warehouse, or the like at terminal location 116.

With continued reference to FIG. 1, server 104 may classify the initial location 112 and/or terminal location 116 to a geographic centroid. As used in the current disclosure, a "geographic centroid" is a central location for the collection, distribution, and/or transportation of orders 108. A "central location," as used in the current disclosure, is a location that is easily accessible for the collection, distribution, and transportation of orders 108. A central location may be determined by the geographic location of the user, initial location, terminal location, or infrastructure related to the collection distribution and/or transportation of orders 108. In some embodiments, geographic centroid may comprise an order pick-up/drop off location such as a store front. In other embodiments, a geographic centroid may comprise a warehouse, airport, factory, distribution center, and the like. A geographic centroid may be configured to be with a predetermined geographic radius of the initial location 112 or the terminal location 116. Examples of a geographic radius may include a radius of 0.5 mile, 1 mile, 2 miles, 5 miles, 10 miles, 15, miles, 30 miles, 50 miles, 100 miles, and the like from either an initial location or a terminal location. A non-sapient payload and/or order 108 may be configured to be delivered to a geographic centroid prior to being delivered to a terminal location 116 or shortly after being received from an initial location 112.

With continued reference to FIG. 1, server 104 may be configured to classify geographic centroid to one or more the initial locations 112 and/or terminal locations 116. As used in the current disclosure, a "centroid classifier" is a machine-learning model that sorts inputs into categories or bins of data, outputting the categories or bins of data and/or labels associated therewith. Centroid classifier may be consistent with the classifier described below in FIG. 17. Inputs to the centroid classifier may include, as a non-limiting example, orders 108, initial location 112, terminal location 116, non-sapient payload, examples of geographic centroids, any combination thereof, or the like. The output to the centroid classifier may be a geographic centroid that is specific to the given order 108. Centroid training data is a plurality of data entries containing a plurality of inputs that are correlated to a plurality of outputs for training a processor by a machine-learning process to align and classify one or more the initial locations 112 and/or terminal locations 116 to a geographic centroid sp. Centroid training data may be received from a database. Centroid training data may contain information about, as a non-limiting example, orders 108, initial location 112, terminal location 116, non-sapient payload, examples of geographic centroids, any combination thereof, or the like. Centroid training data may be generated from any past geographic centroids. Centroid training data may correlate an example of a geographic centroids to an example of an initial location 112 and/or a terminal location 116. The "example of a geographic centroids," "example of an initial location," and "example of an terminal location" may be prior a prior initial location 112, terminal location 116, and/or geographic centroids, respectively. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, system 100 may include a path-selection module 120 operating on at least a server 104. Path-selection module 120 may include any suitable hardware or software module. In an embodiment, the path-selection module may be configured to identify at least an aeronautic path 124 from the initial location to the terminal location. As used herein, an "aeronautic path" is path of travel of orders between an initial location to a terminal location. This may also include the path of travel of any goods, services, equipment, or personnel. In an embodiment, an aeronautic path 124 may include a chain of travel and/or transport from a starting point, such as initial location, to a destination, such as terminal location, in which at least a stage of the travel and/or transport is performed using an aeronautic excursion. An aeronautic excursion, as used in this disclosure, may include any trip or voyage taken using an aircraft. Aeronautic excursion may be the same or similar to a flight. Aircraft may include, without limitation, a fixed-wing aircraft such as an airplane, a rotor-based aircraft such as a helicopter or autogiro, a lighter-than-air aircraft such as blimp or dirigible, or any other vehicle used to transport persons and/or good through the air. Aeronautic excursion data may include data concerning mixed-payload aeronautic excursions. As used herein, a "mixed-payload" is a payload, defined as when anything carried on the aircraft besides the aircraft itself, materials used or usable for maintaining flight, or flight crew such as pilots, co-pilots, flight attendants, security personnel, or the like, includes both sapient payload and non-sapient payload. A "mixed-payload flight" is a flight or aeronautic excursion wherein the cargo is comprised of a mixed payload.

With continued reference to FIG. 1, identification by path-selection module 120 of at least an aeronautic path 124 may include identifying at least an origin airport and at least a destination airport, defined, respectively as an airport at which an aeronautic excursion that is part of at least an aeronautic path 124 initially departs, and an airport at which an aeronautic excursion that is part of at least an aeronautic path 124 arrives. At least an origin airport may include an airport relatively close geographically or in terms of travel time to initial location; there may be a plurality of such origin airports. For instance, an order 108 may be located near a metropolitan area with two airports, or near to a first airport in a first city and slightly farther from a second airport in a second city; path selection module 120 may compare distances and/or times from initial location to airports to thresholds, such as without limitation considering only airports within a one-hour drive of initial location. Threshold may alternatively or additionally be a relative threshold; for instance, and without limitation, path-selection module 120 may locate a nearest airport to initial location and may consider as origin airports all airports less than a threshold amount more distant in terms of time and/or distance than the nearest airport. Relative threshold may be used to select one or more airports for which ground transport of items may be similar if not equivalent, presenting aeronautic paths 124 having roughly comparable transit times. Path selection module 120 may select at least a destination airport using any method or method steps suitable for selection of at least an origin airport, including comparison of distance and/or time in ground transport to absolute and/or relative thresholds as described above.

With continued reference to FIG. 1, Path-selection module 120 may be configured to identify an aeronautic path 124 using a using a path selection machine learning model. As used in the current disclosure, a "path selection machine learning model" is a mathematical and/or algorithmic representation of a relationship between inputs and outputs. In some embodiments, a path selection machine learning model may comprise a classifier. A path selection machine learning model may be consistent with the machine learning model described herein below in FIG. 19. Inputs to the machine learning model may include an order 108, an initial location 112, and a terminal location 116, examples of aeronautic paths 124, and the like. This data may be received from a database, such as aeronautic excursion database 220, freight terms database 232, ground transport database 236, and the like. Example aeronautic paths 124 may come from the previous selections of aeronautic paths 124. Path selection learning model may by trained using path selection training data. Path selection training data is a plurality of data entries containing a plurality of inputs that are correlated to a plurality of outputs for training a Path-selection module 120 by a machine-learning process. Path selection training data may correlate an example of a aeronautic path 124 and an order to an aeronautic path 124. Path selection training data may include order 108, an initial location 112, and a terminal location, examples of aeronautic paths 124, and the like. Path selection training data may include past identifications of aeronautic path 124. Path selection training data may be stored in a database, such as a training data database, or remote data storage device, or a user input or device.

Still referring to FIG. 1, processor may be configured to generate a machine learning model, such as a path selection machine learning model, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)\ P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n}a_i^2}$, where $a_i$ is attribute number experience of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, an aeronautic path 124 may comprise stops at one or more geographic centroids. An aeronautic path 124 may include travel from an initial location 112 to one or more geographic centroids. An aeronautic path 124 may also include travel from a geographic centroids to a terminal location 116. Aeronautic path 124 may additionally comprise travel from a first geographic centroid to a second geographic centroid or any one of a plurality of geographic centroids. A first geographic centroid may be located at a central location near the initial location 112, while the second geographic centroid may be located at a central location near the terminal location 116. Travel between a geographic centroid, an initial location, and a terminal location may be done using ground transport, air transport, or the use of one or more services such as the United States Postal Service, FedEx, UPS, DHL, and the like. In an embodiment, stops at a geographic centroid may be used to increase the efficiency of the aeronautic path 124. In another embodiment, stops at a geographic centroid may decrease the cost of transporting a non-sapient payload from the initial location 112 to a terminal location 116.

With continued reference to FIG. 1, server 104 may be configured to generate an optimal route 128 for the at least an order 108 as a function of the aeronautic path 120. As used in the current disclosure, an "optimal route" is the most efficient aeronautic path 120 to deliver an order from an initial location 112 to a terminal location 116. Efficiency may be measured with respect to arrival time, time in transit, time on shelf, cost, and the like. Arrival time may include the time the order reaches the terminal destination. Time in transit may include the total time between the order 108 leaving the initial location 112 until it reaches the terminal location 116. Total time in transit may include a consideration of weather conditions, traffic, arrival/departure of a flight, history of delays, and the like. Time on shelf may be a consideration of how long an order will be stored between the time it leaves the initial location 112 until it reaches a consumer. In an embodiment there may be a plurality of optimal routes for some degree of optimization and/or degree of similarity between optimization levels of a plurality. In an embodiment, a Path-selection module 120 may identify a plurality of aeronautic paths 124 to transport an order 108 from an initial location 112 to a terminal location, Server 104 may be configured to identify one or more optimal routes 124 of the plurality of aeronautic paths 124. Server 104 may identify the most optimal route 128 as a function of the total time in transit of the order 108. In a non-limiting example, aeronautic paths 124 A, B, and C may be configured to have a total transit time of 1:45 hours, 2:20 hours, and 3:00 hours, respectively. The optimal path 124 terms of transit time would be A because it has the shortest transit time in total. In furtherance of the above non-limiting example, aeronautic paths 124 A, B, and C may arrive at a terminal location at 4:00 pm, 2:00 pm, and 10:00 am, respectively. optimal path 124 terms of arrival time would be aeronautic path 124 C because it arrives earliest in the day.

With continued reference to FIG. 1, server 104 may be configured to generate an optimized route 128 from a plurality of aeronautic paths 124 using a using an optimization machine learning model. As used in the current disclosure, a "optimization machine learning model" is a mathematical and/or algorithmic representation of a relationship between inputs and outputs. In some embodiments, a optimization machine learning model may comprise a classifier, linear optimization, mixed-integer optimization, and/or greedy algorithm. An optimization machine learning model may be consistent with the machine learning model described herein below in FIG. 19. Inputs to the machine learning model may include an order 108, an initial location 112, and a terminal location 116, a plurality of optimized route 128 examples of an optimized route 128, and the like. Outputs to the optimization machine learning model may include an optimal route 128 specific to the current order. This data may be received from a database, such as aeronautic excursion database 220, freight terms database 232, ground transport database 236, and the like. Examples of optimized routes 128 may come from the previous selections of optimized routes 128. Optimization machine learning model may by trained using optimization training data. Optimization training data is a plurality of data entries containing a plurality of inputs that are correlated to a plurality of outputs for training an optimization machine-learning model by a machine-learning process. Optimization training data may correlate an example of an optimized route 128 and a plurality of aeronautic paths 124 to an optimized route 128. Optimization training data may also correlate an initial location 112, terminal location 116, and aeronautic path 124 to an optimized route 128. Optimization training data may include order 108, an initial location 112, and a terminal location 116, a plurality of optimized routes 128, examples of an optimized route 128, and the like. Optimization training data may include past identifications of aeronautic path 124. Optimization training data may be stored in a database, such as a training data database, remote data storage device, or a user device.

Still referring to FIG. 1, an optimal route ranking may be generated as a function of the optimized route 128 and the plurality aeronautic paths 124. As used in the current disclosure, a "Optimal route ranking" is a ranking of how efficiency of a given aeronautic path 124. A optimal route ranking may be generated with respect to arrival time, time in transit, time on shelf, cost, and the like. A optimal route ranking may be calculated on a scale from 1-10, wherein a rating of 1 may be a an inefficient aeronautic paths 124 whereas a rating of 10 may be an extremely efficient aeronautic paths 124. A optimal route ranking may be generated from optimized route 128 and the plurality aeronautic paths 124. In some embodiments, generating the optimal route ranking may include linear regression techniques. Server 104 may be designed and configured to create a machine-learning model using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm mounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 1, a server 104 may be configured to produce an assigned route 132. As used in the current disclosure, an "assigned route" is the optimized route 128 that an order 108 will take from an initial location to a terminal location. An assigned route 132 may be selected based on timing. An assigned route 132 may also be selected as a function of the assigned route 132 of other orders 108 that will travel the same aeronautic path 124 as the current order. aeronautic paths 124 In a non-limiting example, if an optimized route 128 of an order 108 would cause the other packages to be delayed, the most optimal route 128 may not be selected as the assigned route 128 because of the disturbance to the other packages. In this scenario, server 104 may select the second most optimal route 128, because this route is less invasive to other orders 108 that the most optimal routes 128. In some embodiments, server 104 may not select an assigned route 132 of the plurality of optimal routes 128. In this non-limiting scenario, server 104 may place the rejection to select an assigned route 136 of the through the optimization machine learning model in a feedback loop. As used in the current disclosure, a "feedback loop" is a process in which the outputs of a system are circled back and used as inputs. This may result in the identification of a second optimal route 128. The second optimal route 128 might be based on an objective function of total delays in a cluster or region and optimization of each individual route.

With continued reference to FIG. 1, a server 104 may be configured to produce an assigned route 132 as a function of an optimal route ranking. In an non-limiting example, a plurality of optimized routes 124 A, B, and C may have an optimized route ranking of 2, 6, 8, respectively. A server 104 may be configured to select optimized route 124 C as the assigned route 132 because it has the highest optimized route ranking of the plurality of optimized routes 124. In some embodiments, if there is a timing conflict with the optimal route 124 with the highest optimized route ranking the optimal route 124 with the second highest ranking may be selected. In furtherance of the above non-limiting example, if optimized route 124 C conflicts with the assigned route 132 of other orders 108 delaying them or creating other inefficiencies optimized route 124 B may be selected as the assigned route 136 of the order 108.

Figure 2:
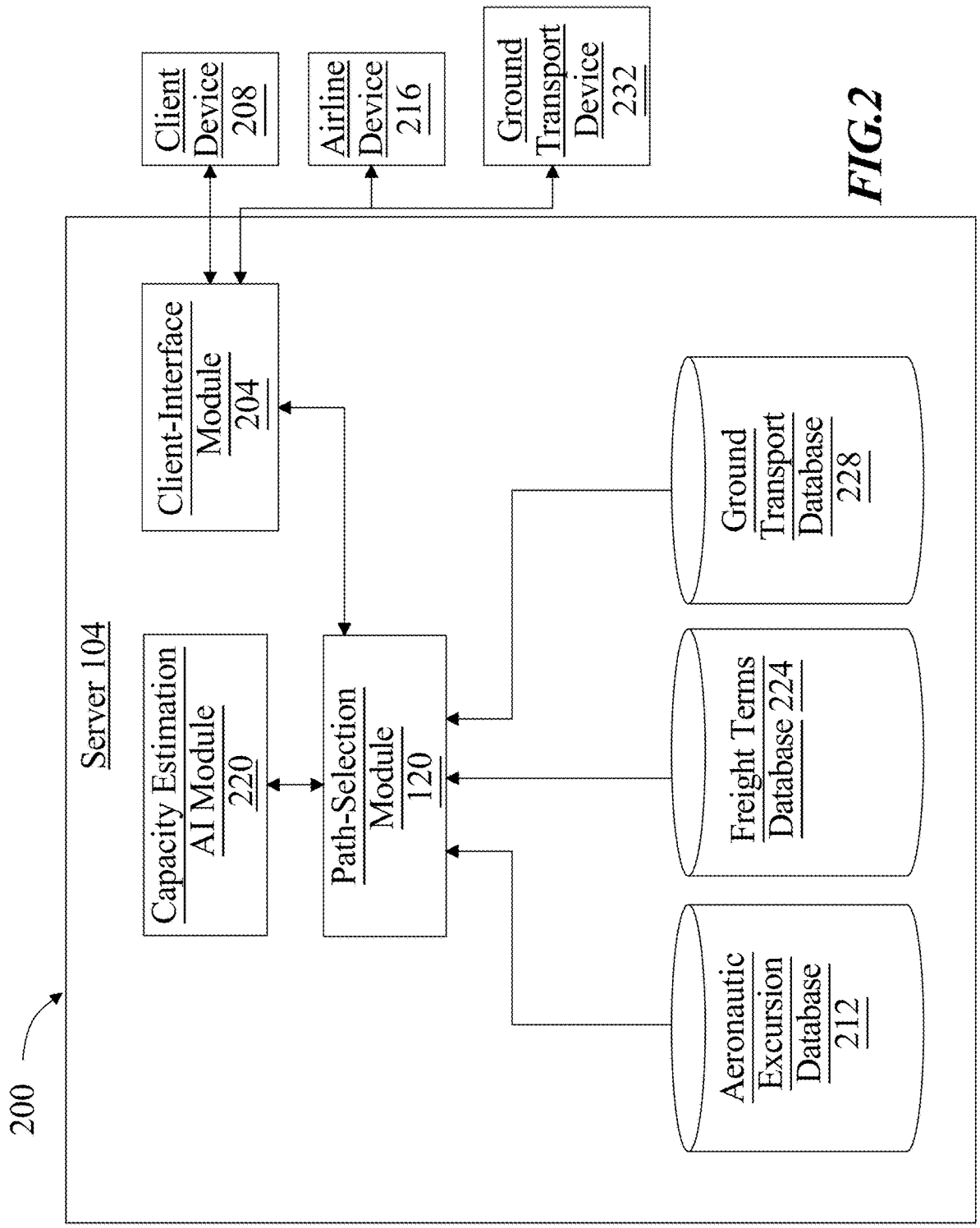
FIG. 2 is a block diagram illustrating an exemplary embodiment of a system for selection of physical asset transfer paths using mixed-payload aeronautic excursions.

Referring now to FIG. 2, system 200 may include a client-interface module 204 operating on the at least a server. Client-interface module 204 may include any suitable hardware or software module. In an embodiment, client-interface module 204 is configured to receive an initial location, a terminal location, and a description of at least an element of non-sapient payload from a client device 208. Client device 208 may include any computing device as described below in reference to FIG. 19. In an embodiment, client device 208 may be a device operated by a user interacting with system 200 to perform a physical transfer of items from initial location to terminal location. For instance, and without limitation, user may be a person who wishes to send an item, which may include without limitation a parcel, shipment of goods, or shipment of products from a residence, business, factory, warehouse, or the like at initial location to a residence, business, factory, warehouse, or the like at terminal location. Client-interface module 204 may provide any suitable user interface via client device 208 for entry of information, including a graphical user interface (GUI) such as a web-page GUI, a GUI provided via a native application running on client device 208, or the like. GUI may include one or more fields for data entry, including textual entry fields in which text may be typed, entered by voice-to-text data entry, or the like, drop-down menus listing options, calendar entry fields for entry of dates and/or times, radio buttons, checkboxes, links, or any other event handlers and/or GUI fields or elements for entry of data and/or user commands that may occur to a person skilled in the art, upon reviewing the entirety of this disclosure.

In an embodiment, and continuing to refer to FIG. 2, client-interface module 204 and/or GUI may provide fields for user entry of and/or receive one or more additional elements of information. For example, and without limitation, a user may enter, via client device 208 and/or client-interface module 204, one or more temporal attributes of a physical transfer of one or more items, including a date and/or time for arrival of the one or more items at terminal location, a date and/or time for arrival of the one or more items at initial location, and/or or dates or times during which one or more stages of physical transfer are to be completed as described in further detail below. User may enter, via client device 208 and/or client-interface module 204, one or more item handling conditions, such as a degree of care to which one or more items should be subjected during transfer, a degree of fragility of one or more items, an exceptional parameter such as excessive weight or an unwieldy or unusual shape or one or more items, special conditions for transfer such as refrigeration, heating, insulation, or the like during transfer, care requirements for living organisms to be transferred, and/or any other conditions for handling attendant to a physical transfer of items as may occur to persons skilled in the art upon reviewing the entirety of this disclosure. Additional information entered via client device 208 and/or client-interface module 204 may include weights of one or more items, with or without packaging. Additional information entered via client device 208 and/or client-interface module 204 may include volumes of one or more items, with or without packaging. Additional information entered via client device 208 and/or client-interface module 204 may include one or more cost parameters, including a maximum desired price or the like. Information entered via client device 208 and/or client-interface module 204 may include any details concerning physical transfers of items that may occur to persons skilled in the art upon reviewing the entirety of this disclosure.

Still referring to FIG. 2, path selection module 120 may be configured to identify a plurality of aeronautic excursions traversing the at least an aeronautic path 124. In an embodiment, path selection module 120 may retrieve data describing one or more aeronautic excursions from an aeronautic excursion database 212, which may contain any tables and/or information as described in further detail below, including without limitation aeronautic excursion times, origin airports, destination airports, stopovers, or the like. Aeronautic excursion data may alternatively or additionally be received from an airline device 216 operated by an airline or one or more persons working for or with an airline, for instance via client-interface module 204, or from an operator data feed and/or airport data feed as described in further detail below. Identifying the one or more aeronautic excursions may include identifying any feature of any aeronautic excursions, including one or more departure times, arrival times, quantities of flight time, layover times, one or more aircraft engaging in the at least an aeronautic excursion, or the like. Identifying at least an aeronautic excursion may include identifying one or more interim airports, which may include any airports at which an aircraft engaging in at least an aeronautic excursion may land during the course of the aeronautic excursion, such as "stopover" points. At least an aeronautic excursion may include more than one plane and/or airline.

In an embodiment, and still referring to FIG. 2, path-selection module 120 may be configured to select an aeronautic excursion of the plurality of aeronautic excursions based on a plurality of excess non-sapient payload storage estimations corresponding the plurality of aeronautic excursions. Each non-sapient payload storage estimation may be determined for one aeronautic excursion of plurality of aeronautic excursions. A capacity estimation AI module 220 may determine and/or estimate non-sapient payload storage capacity as described in further detail below in reference to FIG. 3. Selection may include selection of a subset of plurality of aeronautic excursions having sufficient capacity to perform the physical transfer of items as required by information received via client-interface module 204.

Continuing to refer to FIG. 2, path-selection module 120 may alternatively or additionally select an aeronautic excursion from plurality of aeronautic excursions using one or more additional criteria. One or more additional criteria may include any additional data concerning aeronautic excursion of at least an aeronautic excursion. Selection based on additional data may include without limitation selection based on one or more times or distances. As a non-limiting example, selection may include selection based on length and/or duration of at least an aeronautic excursion, such as total flight time, total time from origin airport to destination airport, total flight distance, and/or total distance from origin airport to destination airport; any such criteria may be retrieved from aeronautic excursion database 212, received from airline device 216, and/or via an operator data feed and/or airport data feed as described in further detail below. One or more additional criteria may include one or more freight terms, defined for the purposes of this disclosure as data describing parameters according to which one or more airlines are able and/or willing to engage in freight transport. One or more freight terms may include, without limitation, costs charged by airlines, such as costs per unit weight, costs per unit volume, costs per category of item, costs for handling options such as handling for fragile goods, perishable items, refrigerated items, heated items, living creatures such as plants and/or animals, human remains, human organs, pharmaceuticals, hazardous materials, or the like. One or more freight terms may include, without limitation, capabilities to transport one or more categories of goods, such as fragile goods, perishable items, refrigerated items, heated items, living creatures such as plants and/or animals, human remains, human organs, pharmaceuticals, hazardous materials, or the like. One or more freight terms may be received from an airline device 216 and/or one or more airport and/or operator feeds. Alternatively or additionally, one or more freight terms may be retrieved from a freight terms database 224; freight terms database 224 may include any database and/or datastore suitable for use as any other database as described in this disclosure. Freight terms database 224 may be populated using any suitable methods and/or sources of data, including without limitation airline device 216 and/or one or more airport and/or operator feeds.

As a further non-limiting example, and still referring to FIG. 2, selection may include selection based on one or more parameters of ground transport. One or more parameters of ground transport may include distances and/or times to be covered by ground transport from initial location to origin airport and/or to an accepting warehouse, distances or times from an accepting warehouse to an aeronautic excursion, distances and/or times to be covered from a destination airport to a receiving warehouse and/or terminal location, and/or distances and/or times to be covered from a receiving warehouse to terminal location; such distances and/or times may be retrieved from a ground transport database 228 and/or calculated using data from ground transport database 228. For instance, timetable information, locations of ground transport headquarter locations, pickup times and/or frequencies may be retrieved from ground transport database 228 and combined with route calculation and/or map software to determine a likely distance and/or time as described above. Information may alternatively or additionally be received from a ground transport device 232, which may, for instance, provide data to populate ground transport database 228 and/or real-time data such as current locations of ground transport vehicles as determined using global positioning system (GPS) calculations, communications with vehicles' mobile computing devices, or the like.

Continuing to refer to FIG. 2, selection may include selection based on one or more cost of ground transport, such as costs per unit weight, costs per unit volume, costs per category of item, costs for handling options such as handling for fragile goods, perishable items, refrigerated items, heated items, living creatures such as plants and/or animals, human remains, human organs, pharmaceuticals, hazardous materials, or the like. One or more costs may be retrieved from ground transport database 228 and/or received from a ground transport device 232. Selection may include selection based on one or more ground transport parameters, including without limitation capabilities to transport one or more categories of goods, such as fragile goods, perishable items, refrigerated items, heated items, living creatures such as plants and/or animals, human remains, human organs, pharmaceuticals, hazardous materials, or the like. One or more ground transport parameters may be retrieved from ground transport database 228 and/or received from a ground transport device 232.

Still referring to FIG. 2, selection may include selection based on one or more overall values, such as without limitation door to door duration of an aeronautic excursion, defined as the total time from pickup of one or more items as described via client-interface module at initial location to drop-off at terminal location; door to door duration may include any time spent in ground transit, in an accepting warehouse, during security inspection such as without limitation manual, chemical, and/or x-ray inspection, on an aircraft, at an airport, at a receiving warehouse, or the like. One or more overall values may include door-to-door distance, including distance traversed during ground transit, on an aircraft, or the like. One or more overall values may include total cost, including fees and/or costs for ground transport, fees and/or costs for use of an accepting warehouse, fees and/or costs for security inspection such as without limitation manual, chemical, and/or x-ray inspection, fees and/or costs charged for use of cargo space on an aircraft, fees and/or costs for an airport, fees and/or costs for use of a receiving warehouse, or the like. Any aggregate values that are part of any overall costs may alternatively or additionally be used in selection of an aeronautic excursion. Overall values or aggregate values may be compared to one or more thresholds as described above, such as maximum door-to-door transit time, minimum cost, or the like. Each value used in selection, including overall and/or aggregate values, as well as any other values as described above, may include a fixed value, an estimated value, and/or a forecasted value, where forecasting and/or estimation may be performed, without limitation, using machine-learning processes and/or artificial intelligence as described in further detail below. Persons skilled in the art, upon reviewing the entirety of this disclosure, will be aware of various alternative or additional ways that overall and/or aggregate values may be computed and/or used in selection, each of which is considered within the scope of this disclosure.

In an embodiment, and still referring to FIG. 2, selection of an aeronautic excursion from the plurality of aeronautic excursions may include display and/or providing information describing at least an aeronautic excursion to a user; this may be performed by client-interface module 204 via a client device 208. In an embodiment, a user may be provided with a plurality of aeronautic excursions selected using one or more processes and/or criteria as described above. Plurality may be presented to user in the form of options to select for each stage of an aeronautic path 124 to be traversed; for instance, user may be provided with one or more options for ground transport, for receiving warehouse, for origin airport, for destination airport, for interim airports, for flights from or to any airport, and/or for accepting warehouse, from which user may select a preferred option at each stage. Options and/or aeronautic excursions may be provided to the user with any data concerning such options and/or aeronautic excursions, including data useable to make selections as described above, entities performing any step or stage to which an option is applicable, or the like; for instance, a user may select ground transport and/or an aircraft or flight based on cost, an entity performing the step or stage, an overall duration or distance to be covered, ability to perform specific handling needs, or the like. A user may select one aeronautic excursion from the plurality of aeronautic excursions using a link, button, or other event handler that may occur to persons skilled in the art upon reviewing the entirety of this disclosure.

Still referring to FIG. 2, system may be configured to contact one or more entities that perform one or more selected steps and/or stages of a selected aeronautic excursion. For instance, at least a server 104, potentially via client-interface module, may convey data to an airline device 216, ground transport device 232, and/or other computing device operated by a person or entity selected to perform a given step or stage of a selected aeronautic excursion; data may include a request to perform the given step or stage according to parameters provided by the person or entity, which may be any parameters as described above, including estimated duration, distance, cost, handling instructions, or the like. System 200 may receive confirmation from user or entity indicating that terms are accepted. System 200 may receive one or more indications that aeronautic excursion, and/or a step or stage in selected aeronautic excursion has been undertaken; such indications may be provided to client device 208 and/or stored in one or more databases and/or training sets as described below. Indications that aeronautic excursion, and/or a step or stage in selected aeronautic excursion has been undertaken may include, without limitation, actual durations, distances, conditions and/or circumstances of aeronautic excursion and/or step or stage thereof, each of which may be used to update any applicable database as described in this disclosure, to update training data as described in further detail below, and/or to perform new or updated machine-learning tasks as described in further detail below.

Figure 3:
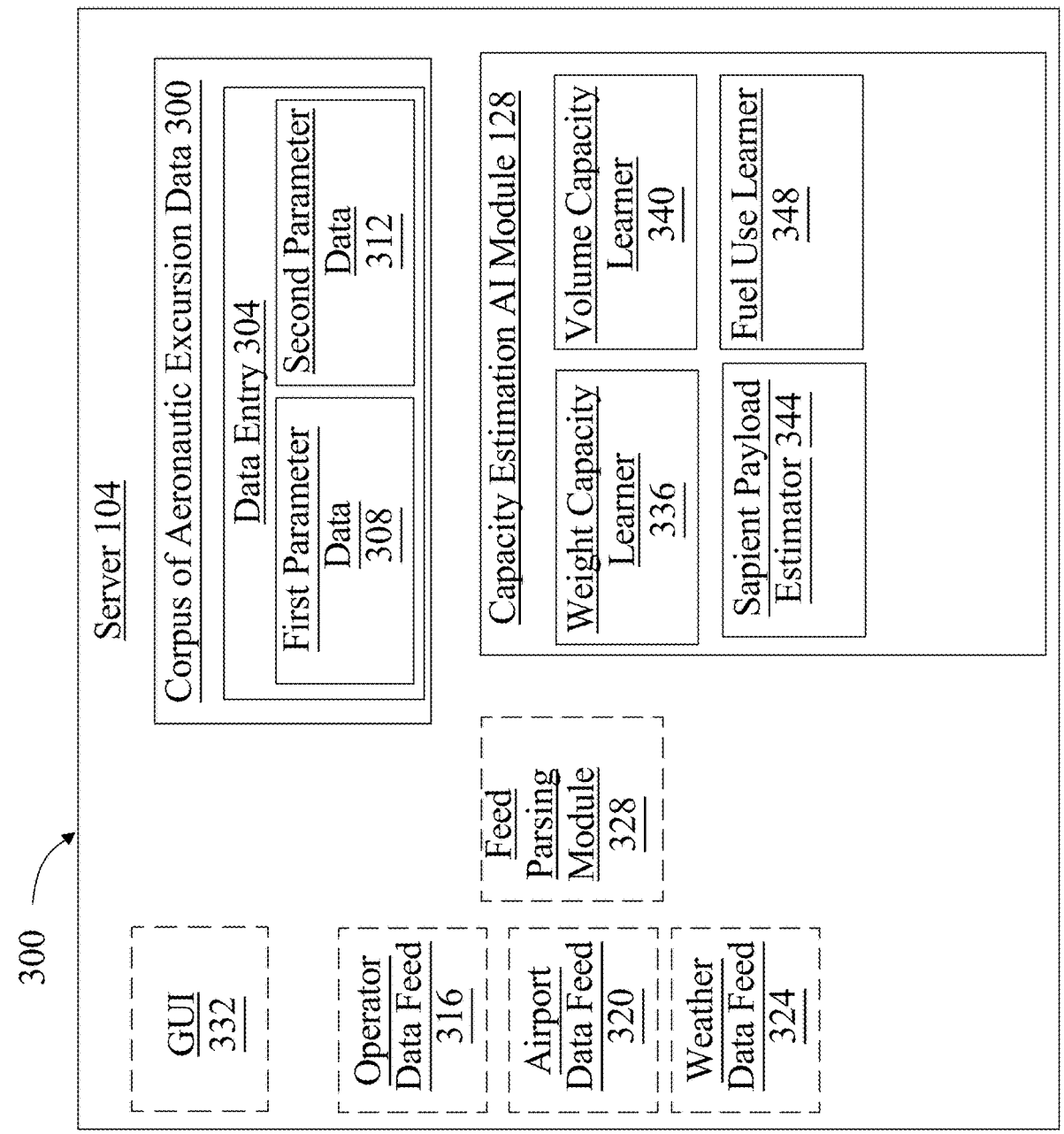
FIG. 3 is a block diagram illustrating an exemplary embodiment an artificial intelligence system for estimating excess non-sapient payload capacity on mixed-payload aeronautic excursions.

Referring now to FIG. 3, an artificial intelligence system 300 for predicting excess cargo capacity on passenger flights is illustrated estimating excess non-sapient payload capacity on mixed-payload aeronautic excursions is illustrated. System 300 may be incorporated in system 200, and/or may be in communication with system 200; one or more components of system 300 may be incorporated in part or wholly in system 200, and/or may be in communication with one or more components of system 200. As a non-limiting example, system 300 may include at least a server 104 and/or components of system 300 may operate on at least a server 104; alternatively or additionally, part or all of system 300 and/or any component thereof may operate on a different server and/or one or more additional computing devices (not shown). For the sake of clarity, description of system 300 will be made with reference to at least a server 104 and to capacity estimation artificial intelligence module as described above. In an embodiment, at least a server 104 may be designed and configured to produce a corpus of aeronautic excursion data 300. At least a corpus of aeronautic excursion data 300 may include at least a corpus of training data. Training data, as used herein, is data containing correlation that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 3, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name and/or a description of a medical condition or therapy may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below.

With continued reference to FIG. 3, at least a corpus of aeronautic excursion data 300 includes a plurality of aeronautic excursion data entries. Each data entry of plurality of aeronautic excursion data entries may include data pertaining to an aeronautic excursion Aeronautic excursion data may include data concerning mixed-payload aeronautic excursions as described above.

With continued reference to FIG. 3, each aeronautic excursion data entry 304 correlates at least a first aeronautic excursion parameter datum 308 and at least a second aeronautic excursion parameter datum 312. As used in this disclosure, an aeronautic excursion parameter datum is any element of data including any facet of an aeronautic excursion. An aeronautic excursion parameter datum may include any data that was provided prior to an aeronautic excursion; for instance, and without limitation, aeronautic excursion parameter datum may include without limitation data included in a load distribution message (LDM), data contained in a container pallet message (CPM), fuel message, flight plan information including distance to be traveled, number of stops and/or layovers, an origin airport, a destination airport, a flight path to be followed, one or more dates and/or times including times of departure, arrival, layovers, or the like, a time of day that an aeronautic excursion was intended to occupy, and/or a planned duration of flight.

Continuing to refer to FIG. 3, an aeronautic excursion parameter datum may include any data concerning and/or describing an aircraft used in an aeronautic excursion, including without limitation data identifying an entity and/or person operating the aeronautic excursion, such as an airline company and/or owner, pilots crew, maintenance, cleaning, luggage handling, and/or repair personnel at any airport, security personnel on the aircraft of at any airport, an identifier identifying the aeronautic excursion such as a "flight ID," a variety of aircraft undertaking the aeronautic excursion, including without limitation a make, model, manufacturer, or the like, a date of manufacture, a lot of manufacture, a number of years of use and/or operation of the aircraft, a number representing total flying time the aircraft had undergone as of the beginning of the aeronautic excursion, one or more numbers representing an amount of flying time undergone by an aircraft per unit of time such as a decade, year, month, week, or day, and/or maintenance history, including without limitation history of repairs, replacement of parts or components, incidents requiring grounding, emergency landing, diversion, or repairs, or the like. Aircraft data may also include compartment data; for instance, an aircraft used in mixed-payload aeronautic excursions may have a fuselage divided into, for instance, a compartment with seating for persons, a compartment for transport of non-sapient payload items, including without limitation a "luggage compartment," and/or one or more additional compartments used for non-sapient payload items, such as "carry-on" stowage locations.

Still referring to FIG. 3, an aeronautic excursion parameter datum may include, without limitation, aeronautic excursion circumstances data, which may include any information concerning circumstances of aeronautic excursion external to an aircraft; such data may include without limitation information describing weather reports in areas traversed during the aeronautic excursion, weather forecasts in areas traversed during the aeronautic excursion, geographical data concerning areas traversed during the aeronautic excursion, a season during which the aeronautic excursion took place, a calendar date on which the aeronautic excursion took place, a time of day during which the aeronautic excursion took place, a degree of congestion at one or more airports from which the aircraft departed and/or at which the aircraft arrived during the aeronautic excursion, or the like.

Continuing to refer to FIG. 3, an aeronautic excursion parameter datum may include, without limitation, aeronautic excursion data, which may be any data describing how an aeronautic excursion took place. Aeronautic excursion data may include, without limitation, information describing an actual flight plan followed, including distance that was traveled, number of stops and/or layovers that took place, actual origin airport, actual destination airport, an actual flight path that was traversed, one or more actual dates and/or times including times of departure, arrival, actual layovers, a time of day that an aeronautic excursion occupied, actual duration of the aeronautic excursion, flight delay information, landing delay information, passenger feedback, and/or data describing state of non-sapient payload items upon arrival.

Still referring to FIG. 3, an aeronautic excursion parameter datum may include aeronautic excursion communication data, which is defined as data describing electronic communication performed during an aeronautic excursion. Aeronautic excursion communication data may include, without limitation, communication logs describing communications between pilots and other entities and/or persons such as without limitation air traffic controllers. Aeronautic excursion communication data may include without limitation transponder-based communication. Aeronautic excursion communication data may include automated dependent surveillance-broadcast (ADS-B) data including ADS-B-In or ADS-B-Out data. Aeronautic excursion communication data may include flight recorder data. Generally, aeronautic excursion parameter datum may include any other example of aeronautic excursion parameter data described or alluded to in this disclosure, as well as any other example or examples that may occur to a person of ordinary skill in the art upon reviewing the entirety of this disclosure.

Continuing to refer to FIG. 3, an aeronautic excursion parameter datum may include, without limitation, sapient payload data. Sapient payload data may include, without limitation, any information concerning persons making up sapient payload, including individual body weights, average body weights, and/or total body weight, demographic information such as individual ages, average ages, countries, provinces, territories, departments, and/or municipalities of origin, frequency of travel, purpose of travel, or the like.

Sapient payload data may be linked to non-sapient payload data as described in further detail below; for instance, sapient payload data may include data describing amounts of non-sapient payload brought onto an aircraft by one or more persons, and/or an aggregated total of non-sapient data brought onto the aircraft by all persons represented by sapient payload data.

Still referring to FIG. 3, an aeronautic excursion parameter datum may include, without limitation, non-sapient payload data. Non-sapient payload data may include, without limitation, any information concerning items making up non-sapient payload, individual weights of items, average weights of items, and/or total weight of all non-sapient payload. Non-sapient payload data may include, without limitation, individual volumes of items, volumes of storage taken up by individual items, average volumes of items, average volumes of storage space taken up by items, total volume of all non-sapient payload, and/or total volume of storage space taken up by non-sapient payload. Non-sapient payload data may be linked to sapient payload data as described in further detail below; for instance, non-sapient payload data may include data describing amounts of non-sapient payload brought onto an aircraft by one or more persons, and/or an aggregated total of non-sapient data brought onto the aircraft by all persons represented by sapient payload data.

Figure 4:
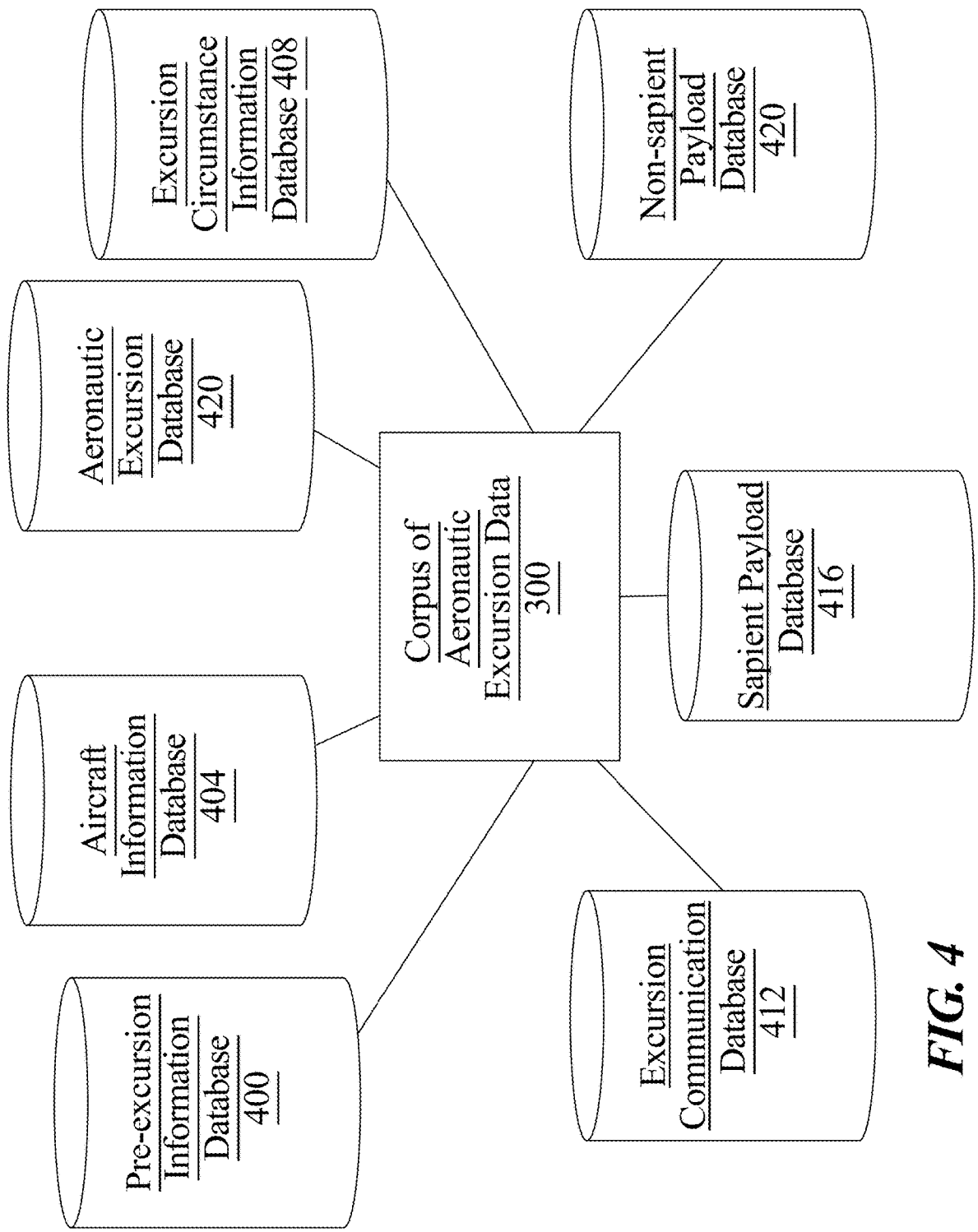
FIG. 4 is a block diagram illustrating exemplary embodiments of databases that may be used to produce training data.

Referring now to FIG. 4, data incorporated in corpus of aeronautic excursion data 300 may be incorporated in one or more databases. As a non-limiting example, one or more elements of pre-excursion information may be stored in and/or retrieved from a pre-excursion information database 400. A pre-excursion information database 400 may include any data structure for ordered storage and retrieval of data, which may be implemented as a hardware or software module. A pre-excursion information database 400 may be implemented, without limitation, as a relational database, a key-value retrieval datastore such as a NOSQL database, or any other format or structure for use as a datastore that a person skilled in the art would recognize as suitable upon review of the entirety of this disclosure. Pre-excursion information database 400 may include, without limitation, any data that was provided prior to an aeronautic excursion as described above.

Figure 5:
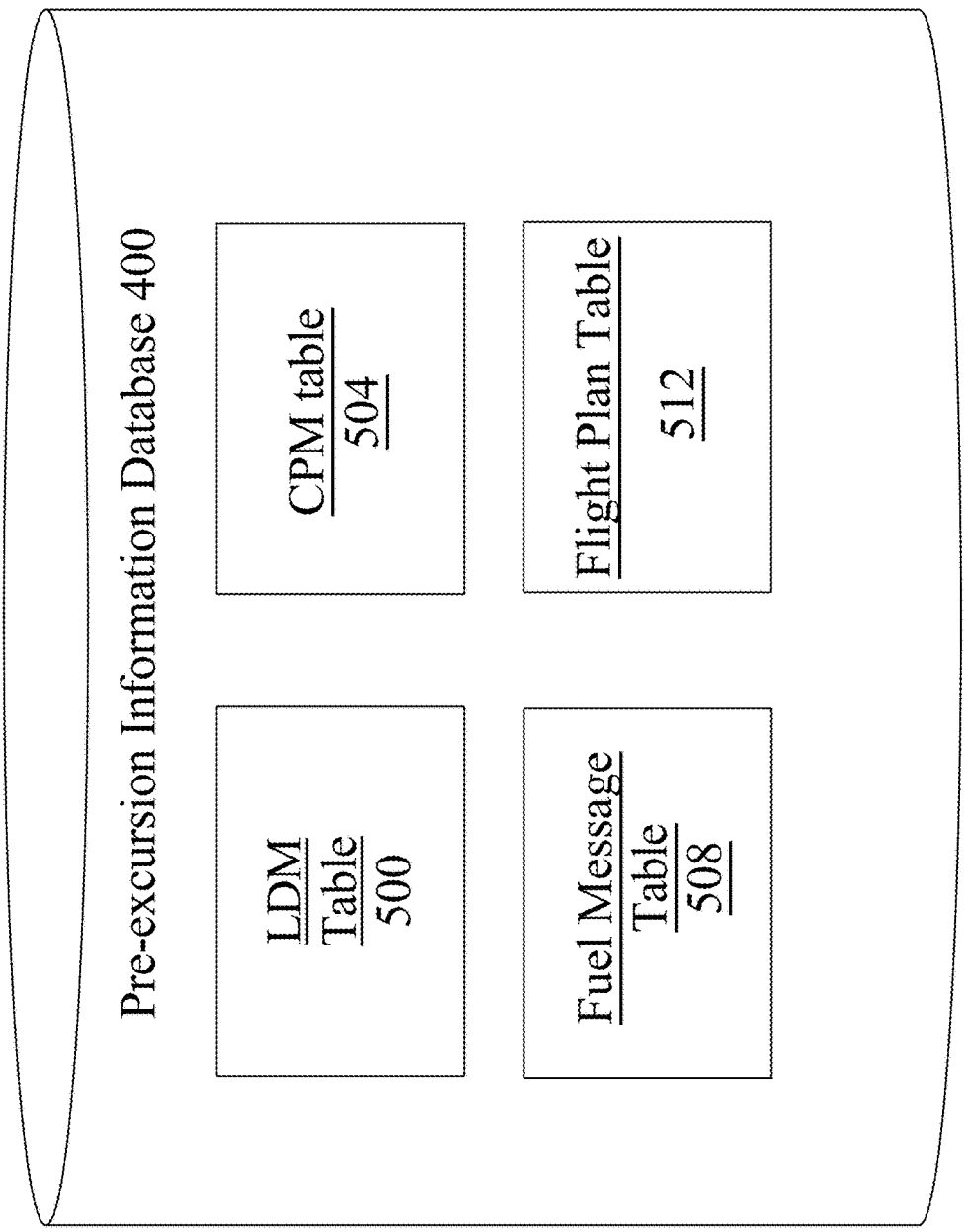
FIG. 5 is a block diagram of an exemplary embodiment of a pre-excursion information database.

Referring now to FIG. 5, one or more database tables in pre-excursion information database 400 may include, as a non-limiting example an LDM table 500 listing LDM information as described above. One or more tables may include a CPM table 504 listing CPM data as described above. One or more tables may include a fuel message table 508, which may list fuel message data as described above. One or more tables may include flight plan table 512 listing flight plan information as described above.

Referring again to FIG. 4, one or more elements of aircraft data may be stored in and/or retrieved from an aircraft information database 404.

Figure 6:
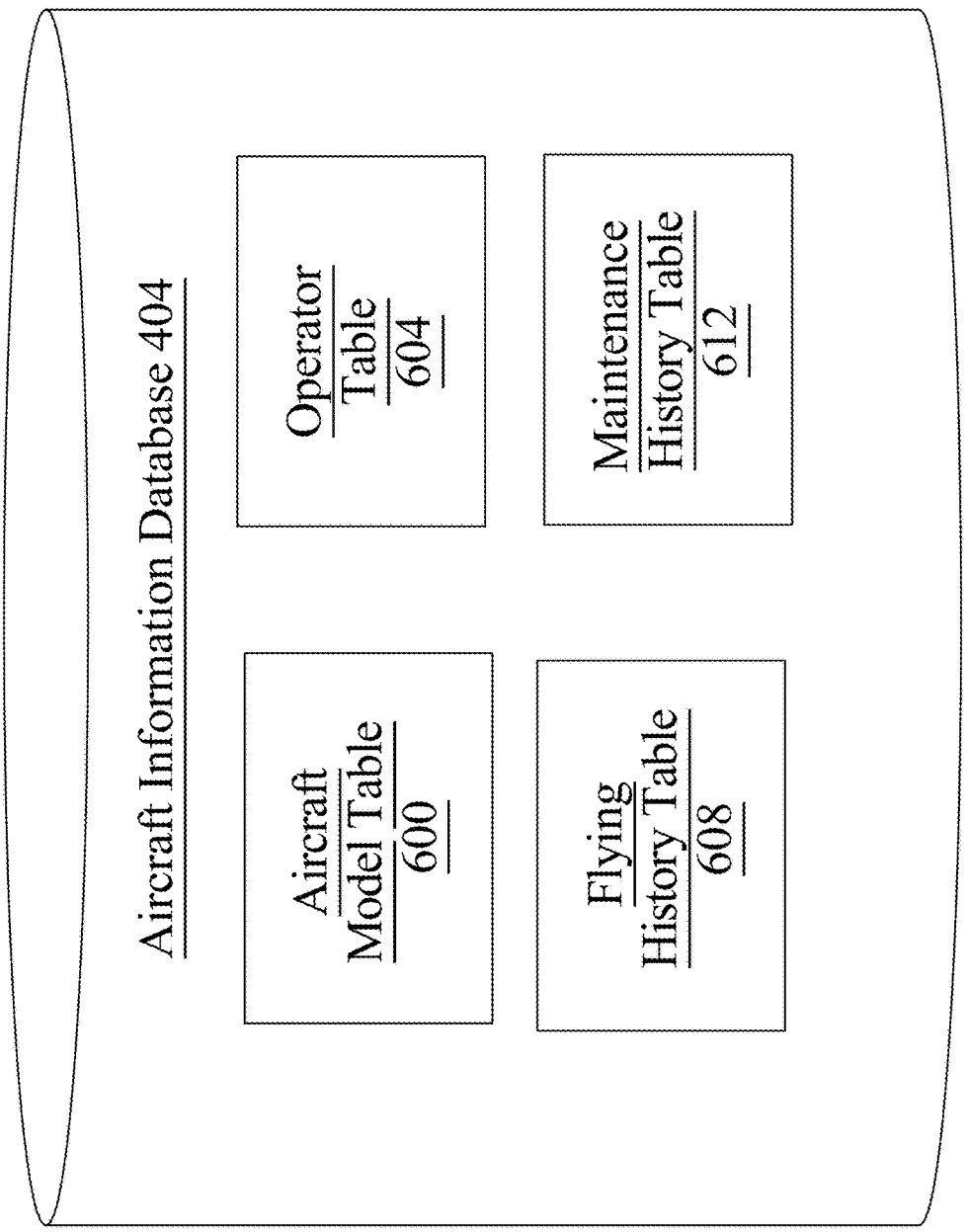
FIG. 6 is a block diagram of an exemplary embodiment of an aircraft information database.

Referring now to FIG. 6, one or more database tables in aircraft information database 404 may include, as a non-limiting example an aircraft model table 600, which may describe a make and model of an aircraft. One or more tables may include an operator table 604, which may describe, without limitation, entities, pilots, and crew operating the aircraft, as described above. One or more tables may include a flying history table 608, which may describe flying time, number of aeronautic excursions, and/or other data concerning flight history of an aircraft. One or more tables may include a maintenance history table 612, which may describe a history of maintenance as described above.

Figure 7:
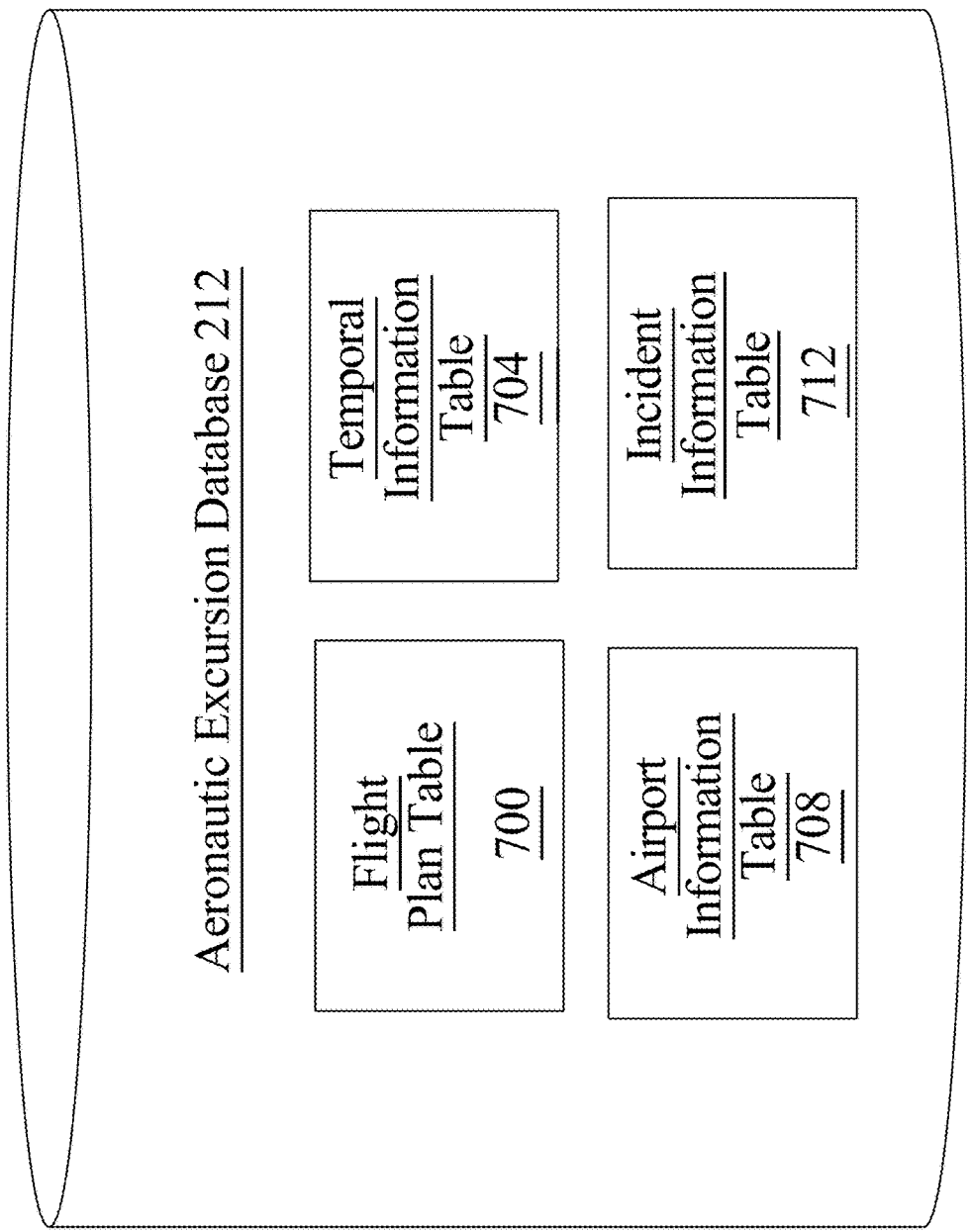
FIG. 7 is a block diagram of an exemplary embodiment of an aeronautic excursion database.

Referring again to FIG. 4, one or more elements of aeronautic excursion data as described above may be stored in and/or retrieved from aeronautic excursion information database 212. Referring now to FIG. 7, one or more database tables in aeronautic excursion information database 212 may include, as a non-limiting example, a flight plan table 700, which may list flight plan information actually followed during an aeronautic excursion, a temporal information table 704 listing dates and times an aeronautic excursion took place, an airport information table 708 listing origin and arrival airports, and an incident information table 712, which may list, without limitation, flight delays, landing delays, passenger feedback, and/or other incidents.

Referring again to FIG. 4, one or more elements of excursion circumstance data may be stored in and/or retrieved from an excursion circumstance information database 408.

Figure 8:
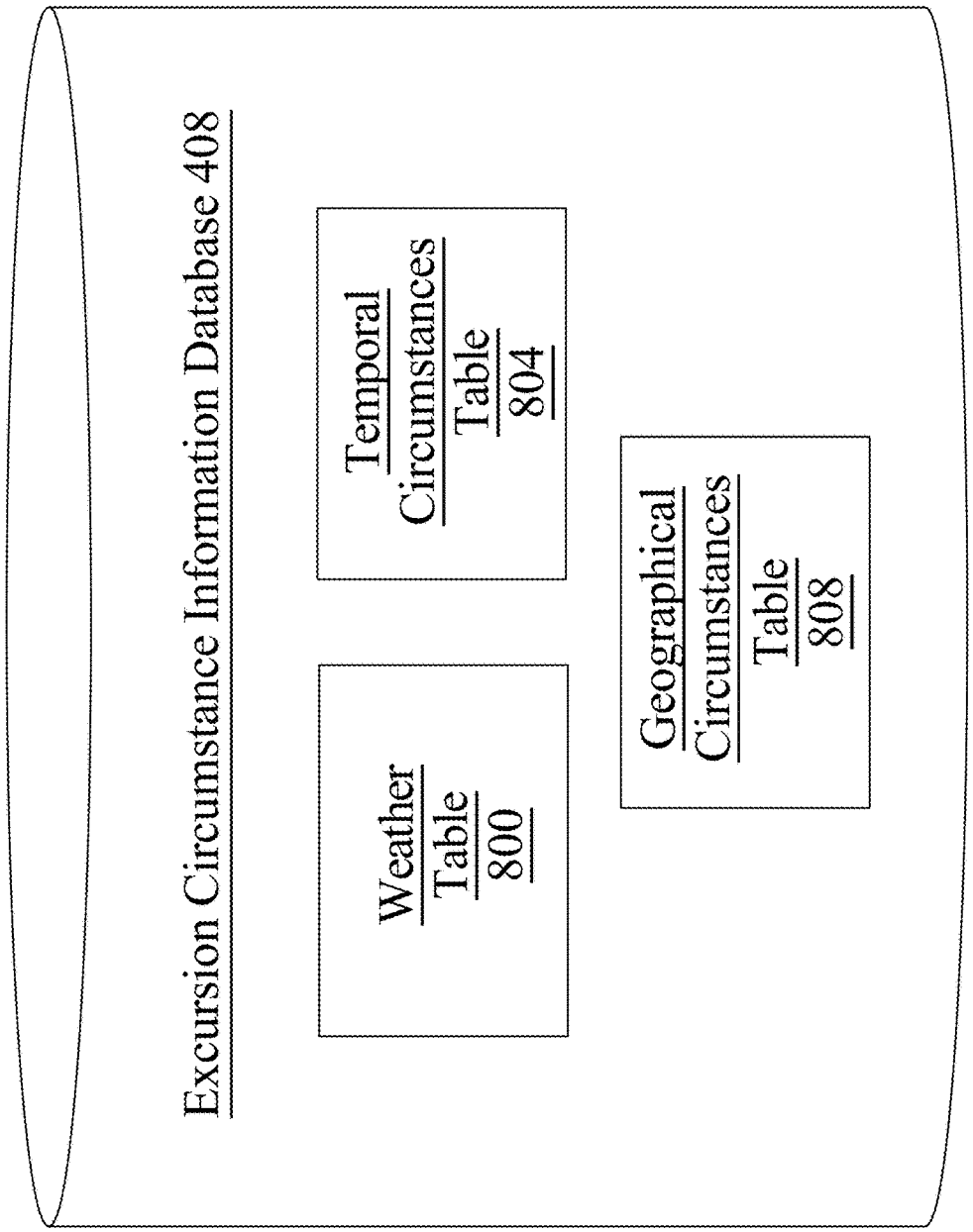
FIG. 8 is a block diagram of an exemplary embodiment of an excursion circumstance information database.

Referring now to FIG. 8, one or more database tables in excursion circumstance information database 408 may include, as a non-limiting example a weather table 800 listing weather conditions at the time of the aeronautic excursion. One or more tables may include a temporal circumstances table 804, which may list a season, time of day, date, time, or other temporal attribute of the aeronautic excursion or one or more portions thereof. One or more tables may include a geographical circumstances table 808 listing one or more geographical circumstances of an aeronautic excursion as described above.

Referring again to FIG. 4, one or more elements of excursion communication data may be stored in and/or retrieved from an excursion communication database 412.

Figure 9:
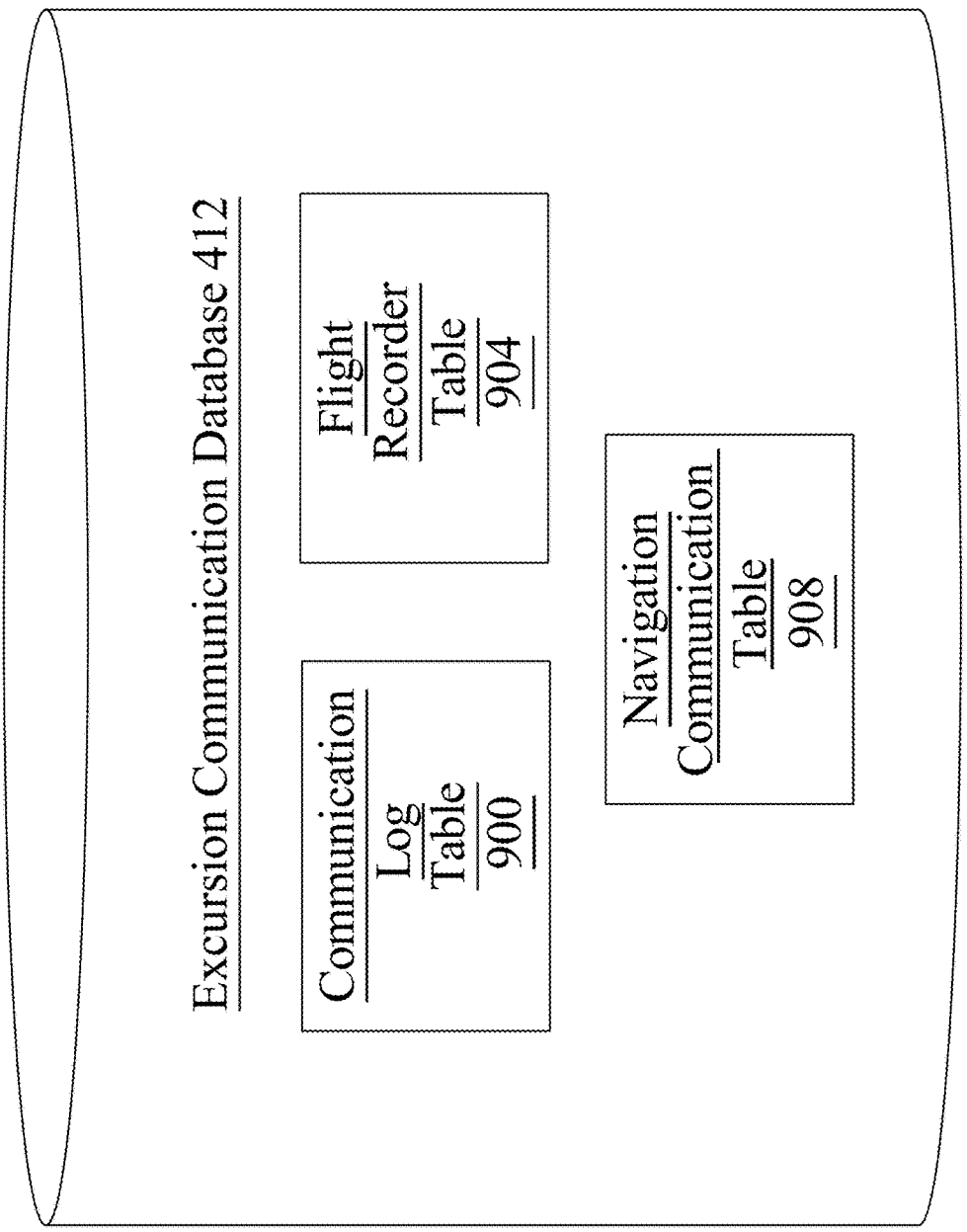
FIG. 9 is a block diagram of an exemplary embodiment of an excursion communication database.

Referring now to FIG. 9, one or more database tables in excursion communication database 412 may include, as a non-limiting example may include a communication log table 900 listing or containing logs of communication between aircraft crew and other entities. One or more tables may include a flight recorder table 904 listing flight recorder information. One or more tables may include a navigation communication table 908 listing transponder, ADS-B, or other data used to convey navigation information from and/or to an aircraft.

Referring again to FIG. 4, one or more elements of sapient payload data may be stored in and/or retrieved from sapient payload database 416.

Figure 10:
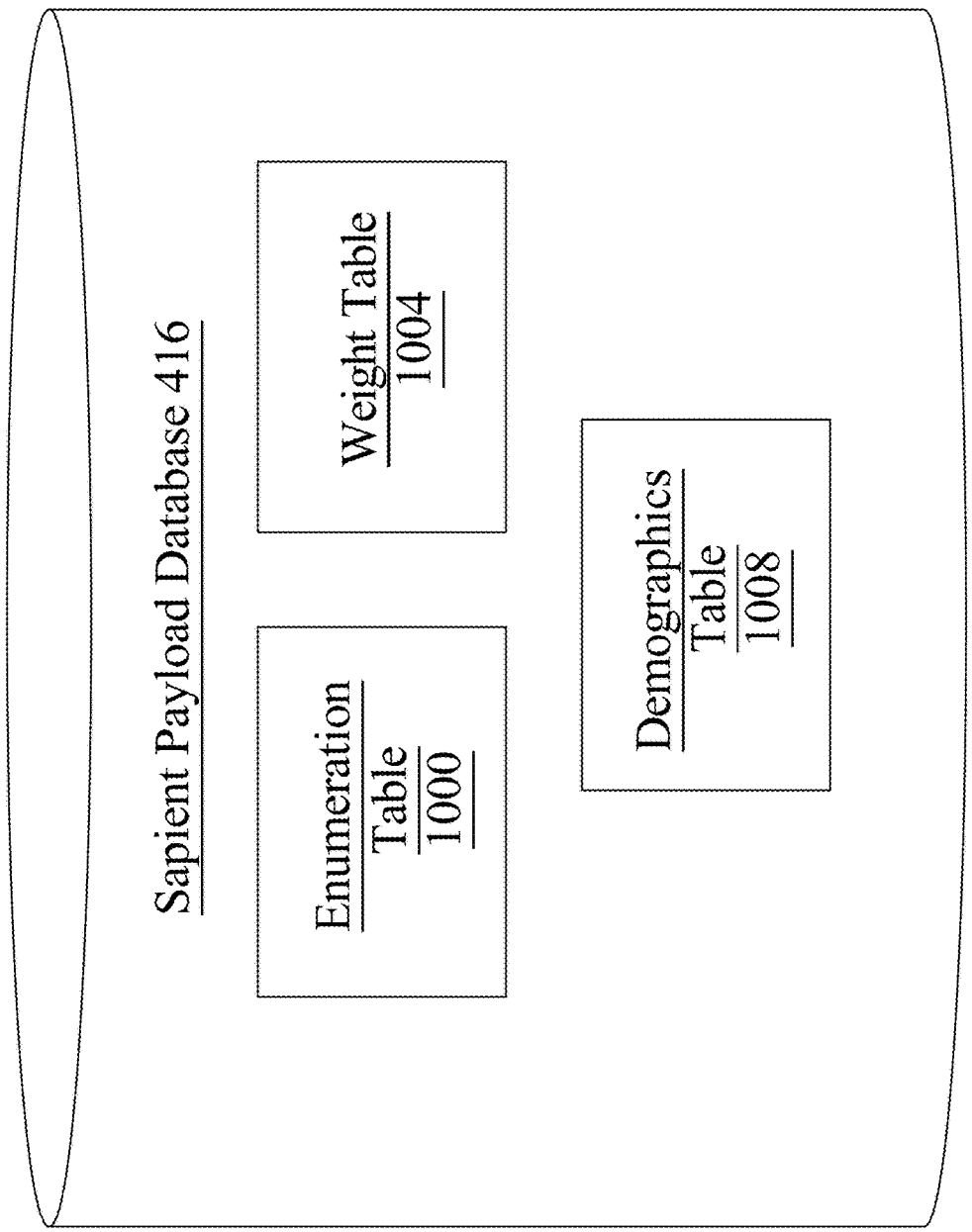
FIG. 10 is a block diagram of an exemplary embodiment of a sapient payload database.

Referring now to FIG. 10, one or more database tables in sapient payload database 416 may include, as a non-limiting example an enumeration table 1000, which may list an enumeration of sapient payload as described above. One or more tables may include a weight table 1004, which may list any or all weights of sapient payload, including average weight per person, total weight, and the like. One or more tables may include a demographics table 1008, which may list any demographic information as described above.

Referring again to FIG. 4, one or more elements of non-sapient payload data may be stored in and/or retrieved from a non-sapient payload database 420.

Figure 11:
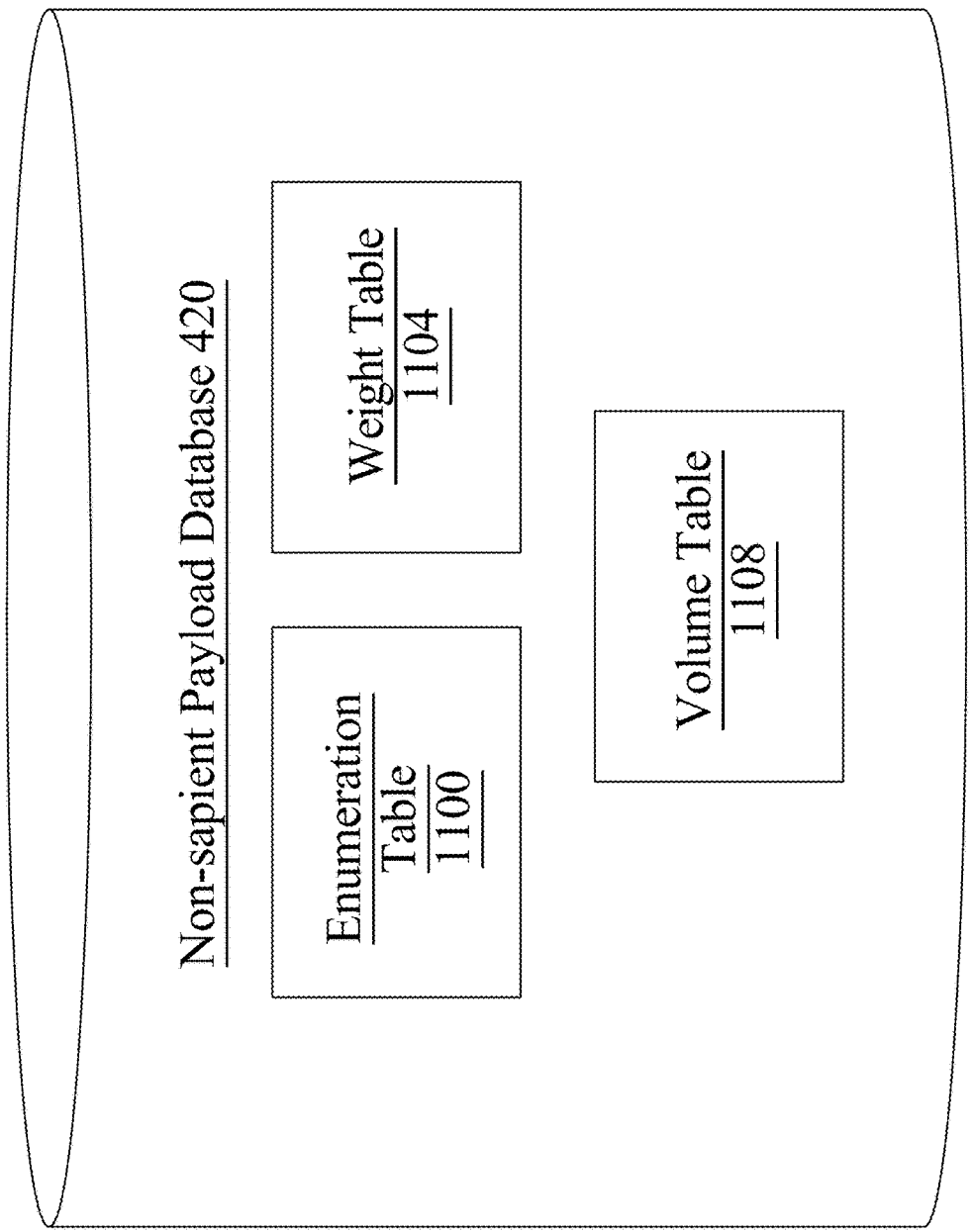
FIG. 11 is a block diagram of an exemplary embodiment of a non-sapient payload database.

Referring now to FIG. 11, one or more database tables in non-sapient payload database 420 may include, as a non-limiting example, an enumeration table 1100, which may list an enumeration of non-sapient payload as described above. One or more tables may include a weight table 1104, which may list any or all weights of non-sapient payload, including average weight per item, total weight, and the like. One or more tables may include a volume table 1108, which may list total volume and/or volume per item of non-sapient payload.

Referring again to FIG. 3, at least a server 104 may be configured to produce the corpus of mixed payload aeronautic excursion data by producing a plurality of sapient payload-to-weight entries, each sapient payload-to-weight entry of the plurality of sapient payload-to-weight entries correlating a number of mixed payloads to a non-sapient payload weight factor. This may be accomplished, without limitation, by retrieving linked and/or associated data from databases as described above in reference to FIG. 4; for instance, at least a server 104 may assemble a training set of corpus of aeronautic excursion data 300 by executing a query at one or more databases to retrieve at least a first excursion parameter datum and correlated at least a second excursion parameter datum. Alternatively or additionally, data feeds may be used to acquire aeronautic excursion data entries. For instance, and without limitation, an operator data feed 316 may receive streamed or discrete-message data from entities operating aircraft, which may include, without limitation, pre-excursion data, aircraft data, aeronautic excursion circumstance data, aeronautic excursion data, excursion communication data, sapient payload data, and/or non-sapient payload data for each aeronautic excursion. As a further non-limiting example, an airport data feed 320 may receive streamed or discrete-message data from airports, traffic controllers, or the like; received data may include, without limitation, pre-excursion data, aircraft data, aeronautic excursion circumstance data, aeronautic excursion data, excursion communication data, sapient payload data, and/or non-sapient payload data for each aeronautic excursion. As an additional non-limiting example, a weather data feed 324 may provide receive streamed or discrete-message flight circumstances data concerning weather; weather data feed 324 may receive information from a weather forecasting and/or reporting service such as, in an non-limiting example, WEATHER.COM as operated by The Weather Company, LLC of Atlanta Ga., and/or weather feeds from the National Oceanographic and Atmospheric Administration (NOAA).

Still referring to FIG. 3, system 200 may include a feed parsing module 328, which may categorize and format data for use in corpus of aeronautic excursion data 300, creation of training sets included in corpus of aeronautic excursion data 300, and/or for placement in databases as described above in reference to FIG. 4. Data in feeds may be received in a standardized form, including without limitation a fixed-length textual field form, a comma-separated value (CSV) form, or in a self-describing format such as without limitation extensible markup language (XML); feed parsing module 328 may be configured to place standardized fields in associated variables, which may be interconnected via references, pointers, or inclusion in common data structures or hierarchies thereof to preserve existing correlations in data as provided in feeds. Alternatively or additionally, feed parsing module 328 may tokenize or otherwise separate and analyze data that is in non-standard formats to sort it into such variables, data structures, and/or hierarchies of data structures. Feed parsing module 328 may be configured to link data from disparate feeds together using variables data structures, and/or hierarchies of data structures. Linking may be performed using common data; for instance, where operator data feed 316 and airport data feed 320 each provide records pertaining to a particular identifier of an aeronautic excursion, or to a particular and uniquely identifiable carrier, destination, departure, date, and/or time combination, feed parsing module 328 may be configured to match the linking data and combine data concerning the same aeronautic excursion from the two feeds together. As a further example, feed parsing module 328 may match up weather forecast and/or reporting data from weather data feed 324 with data acquired from operator data feed 316 and/or airport data feed 320 by matching date, time, and location information to link aeronautic excursion data up with circumstances data describing forecasted and actual weather conditions.

With continued reference to FIG. 3, production of corpus of aeronautic excursion data 300 may include production of training sets correlating at least a first aeronautic excursion parameter datum 308 and at least a second aeronautic excursion parameter datum 312. There may be a single such training set or a plurality thereof. As a non-limiting example, at least a server 104 may be configured to produce the corpus of mixed payload aeronautic excursion data by producing a plurality of sapient payload-to-weight entries, each sapient payload-to-weight entry of the plurality of sapient payload-to-weight entries correlating at least an aeronautic excursion parameter datum to a sapient payload weight datum, where a sapient payload weight datum may include any datum corresponding to a partial or total weight of sapient payload, including without limitation a total weight of sapient payload, an average weight per person, or the like. As a further non-limiting example, at least a server 104 may be configured to produce the corpus of aeronautic excursion data 300 by producing a plurality of sapient payload enumeration entries, each sapient payload enumeration entry of the plurality of sapient payload enumeration entries correlating at least an aeronautic excursion parameter datum to a sapient payload enumeration on an aeronautic excursion, where a sapient payload enumeration represents a number of persons making up a sapient payload on the aeronautic excursion; enumeration may further include enumerations by category such as an enumeration of persons in one passenger class and an enumeration of persons in another passenger class.

Still referring to FIG. 3, and as a further non-limiting example, at least a server 104 may be configured to produce the corpus of aeronautic excursion data 300 by producing a plurality of non-sapient payload-to-weight entries, each non-sapient payload-to-weight entry of the plurality of sapient payload-to-weight entries correlating at least an aeronautic excursion parameter datum to a non-sapient payload weight datum, where a non-sapient payload weight datum may include any datum corresponding to a partial or total weight of non-sapient payload, including without limitation a total weight of non-sapient payload, an average weight per item of non-sapient payload, or the like. As a further non-limiting example, at least a server 104 may be configured to produce the corpus of aeronautic excursion data 300 by producing a plurality of non-sapient payload-to-volume entries, each non-sapient payload-to-volume entry of the plurality of sapient payload-to-weight entries correlating at least an aeronautic excursion parameter datum to non-sapient payload volume datum, where a non-sapient payload volume datum may include any datum corresponding to a partial or total volume of non-sapient payload, including without limitation a total volume of non-sapient payload, a total volume of storage space occupied by non-sapient payload, a total volume of a specific compartment or storage area occupied by non-sapient payload, an average volume per item of non-sapient payload, or the like. This data may, as a non-limiting example, be tracking a likelihood that a projected enumeration may increase or decrease, for instance because of persons switching from one aeronautic excursion to another, being reassigned to an aeronautic excursion owing to weather delays, or the like.

With continued reference to FIG. 3, at least a server 104 may be configured to produce the corpus of aeronautic excursion data 300 by producing a plurality of fuel use entries, each fuel use entry of the plurality of fuel use entries correlating at least an aeronautic excursion parameter datum to a fuel use datum, where a fuel consumption datum is an element of data that describes a rate or quantity of fuel consumption. As a non-limiting example, training data may correlate fuel consumption rates to weather conditions, particular flight paths, particular airports (such as, without limitation, airports more likely to impose significant landing delays), or the like. Persons skilled in the art, upon reviewing the entirety of this disclosure, will be aware of various additional training sets containing various additional correlations which may be used and/or produced consistently with this disclosure.

Continuing to refer to FIG. 3, at least a server 104 is configured to receive at least an aeronautic excursion parameter regarding a future aeronautic excursion. At least an aeronautic excursion parameter may be received by any suitable means, including without limitation receipt via operator data feed 316, airport data feed 320, and/or weather data feed 324, or a combination thereof, as described above. As a non-limiting example, at least an aeronautic excursion parameter may include an identifier of an aeronautic excursion, a departure location, a projected time of departure, a destination, and the like as provided by an airport data feed 320. An operator data feed 316 may indicate a current enumeration of sapient payload and may also indicate a current level of non-sapient payload, including without limitation luggage and/or carry-on items that persons in the projected sapient payload have indicated they will bring. A weather data feed 324 may provide current weather information as well as forecast data indicating likely weather conditions at the time of the aeronautic excursion. At least a server 104 may combine and/or categories this information, for instance using feed parsing module 328, so as to provide it to further modules as described below. In an embodiment, data from at least an aeronautic excursion parameter may be added to one or more databases as described above in reference to FIG. 4, and/or to corpus of aeronautic excursion data 300 and/or training sets incorporated therein. At least an aeronautic excursion parameter may be received a single time or may be updated via periodic and/or streamed receipt of additional data via airport data feed 320, operator data feed 316, weather data feed 324, or the like.

In an embodiment, and still referring to FIG. 3, at least an aeronautic excursion parameter of a future aeronautic excursion may include a freight request; as used in this disclosure, a freight request is an element of data assigning at least an item of non-sapient payload that is not associated with a person of sapient payload to storage space in an aircraft that is undertraining the future aeronautic excursion. In other words, a freight request assigns at least an item of non-sapient payload that is not at least an item of luggage, carry-on luggage, or personal effects of a passenger; such an item may be a part of shipment of goods or materials to be transported using the aircraft during the future aeronautic excursion. In an embodiment, a user or entity may enter a freight request via a graphical user interface 332; for instance, a user may have an item of non-sapient payload that user wishes to convey from a first geographical location to a second geographical location. Continuing the above non-limiting example, user may locate, in a graphical user interface 332 operating on at least a server 104, one or more aeronautic excursions that are scheduled to occur from the first geographical location to the second geographical location; at least a server 104 may, as a non-limiting example, display such geographical excursions using data acquired from at least an aeronautic excursion parameter as described above. Graphical user interface 332 may enable users to search for aeronautic excursions by date, time, origin, and/or destination; persons skilled in the art, upon viewing the entirety of this disclosure, will be aware of various ways in which graphical user interface 332 may permit a user to search and/or browse through at least an aeronautic excursion parameter to locate a desired aeronautic excursion. In an embodiment, graphical user interface 332 may display a current non-sapient payload capacity, which may represent an amount of storage space and/or weight available on an aircraft undertaking a given aeronautic excursion; non-sapient payload capacity may be determined as described in further detail below. Non-sapient payload capacity may include a volume of space available in a particular compartment of an aircraft, such as a luggage compartment; available dimensions of a luggage compartment, and/or of space therein, may also be included.

In an embodiment, and continuing to refer to FIG. 3, a user may enter a volume and/or weight of non-sapient payload that the user wishes to send; this may be entered, without limitation, using fields such as drop-down lists or text fields, which may include elements prepopulating fields with a range of permissible values based on current non-sapient payload capacity, and/or event handlers and/or scripts that enforce limits based on current non-sapient payload capacity. Where at least a freight request is entered, the at least a freight request may be combined with other data of at least an aeronautic excursion parameter; in other words subsequent and/or iterative determinations of current non-sapient payload capacity may account for any entered freight requests, which may represent an additional limit on available volume and/or weight for more sapient and/or non-sapient payload elements.

Still referring to FIG. 3, system 200 includes a capacity estimation artificial intelligence module 220 operating on the at least a server 104. Capacity estimation artificial intelligence module 220 may include any suitable hardware or software module. Capacity estimation artificial intelligence module 220 is designed and configured to generate an excess non-sapient payload storage estimation as a function of the corpus of aeronautic excursion data 300 and the at least an aeronautic excursion parameter. Capacity estimation artificial intelligence module 220 may include one or more learners which engage in machine learning, deep learning, or similar algorithms to develop models and/or heuristics usable to generate excess non-sapient storage estimation, which may include one or more calculations usable to determine current non-sapient payload capacity as defined above. In the following exemplary illustrations, one or more such learners are described for exemplary purposes only; one or more learners as descried above may be combined in a single module with one or more other learners and/or used to produce a combined model with one or more other learners. A given learner may be instantiated by any hardware and/or software instructions producing functionality ascribed to the learner as described below, whether in a discrete module or in a module combining some or all of such functionality with other functionality described herein or compatible therewith. Persons skilled in the art, upon reviewing the entirety of this disclosure, will be aware of various alternative approaches to instantiating the below-described learners and/or functionality thereof, as dictated by various stylistic and/or practical choices, benefits, and/or constraints.

In an embodiment, capacity estimation artificial intelligence module 220 may include, in the sense described above, a weight capacity learner 336, the weight capacity learner 336 designed and configured to determine a nonsapient payload weight capacity a function of the corpus of aeronautic excursion data 300 and the at least an aeronautic excursion parameter. Weight capacity learner 336 may be designed and configured to generate outputs using machine learning processes. A machine learning process is a process that automatically uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language.

Still referring to FIG. 3, weight capacity learner 336 may be designed and configured to generate at least an output by creating at least a weight capacity model relating aeronautic excursion parameter data to weight capacity using the corpus of aeronautic excursion data 300 and generating the at least an output using the weight capacity model; at least a weight capacity model may include one or more models that determine a mathematical relationship between aeronautic excursion parameter data and weight capacity. Such models may include without limitation model developed using linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithm used to generate weight capacity model may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 3, weight capacity learner 336 may generate a weight capacity output using alternatively or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using corpus of aeronautic excursion data 300; the trained network may then be used to apply detected relationships between elements of aeronautic excursion parameter data and weight capacity.

Figure 12:
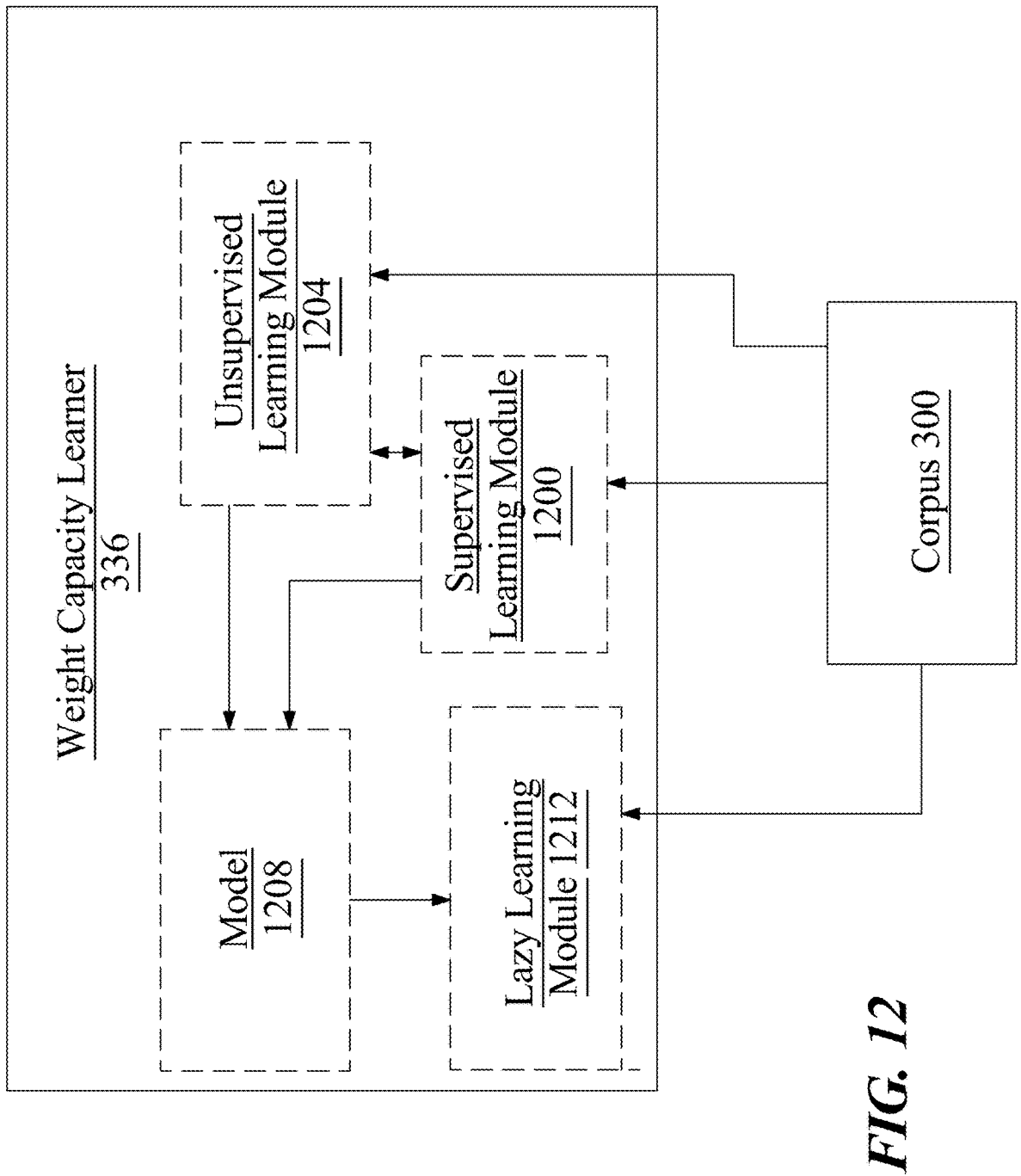
FIG. 12 is a block diagram of an exemplary embodiment of a weight capacity learner.
Figure 13:
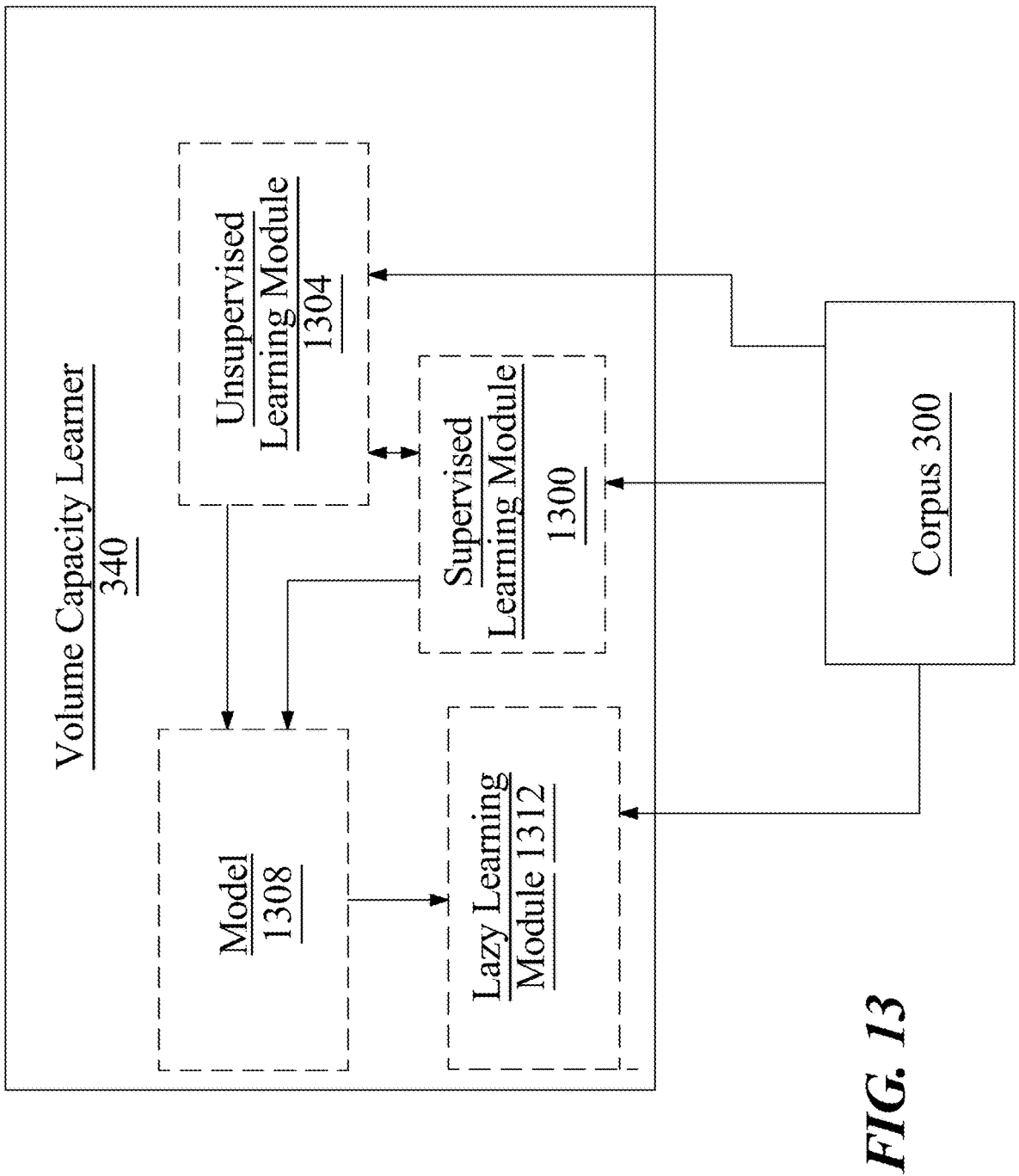
FIG. 13 is a block diagram of an exemplary embodiment of a volume capacity learner.

Referring now to FIG. 12, machine-learning algorithms used by weight capacity learner 336 may include supervised machine-learning algorithms, which may, as a non-limiting example be executed using a supervised learning module 1200 executing on at least a server 104 and/or on another computing device in communication with at least a server 104, which may include any hardware or software module. Supervised machine learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may use aeronautic excursion parameters as inputs, weight capacity as outputs, and a scoring function representing a desired form of relationship to be detected between aeronautic excursion parameters and weight capacity; scoring function may, for instance, seek to maximize the probability that a given element of aeronautic excursion parameter data and/or combination of aeronautic excursion parameters is associated with a given weight capacity to minimize the probability that a given element of aeronautic excursion parameter data and/or combination of elements of aeronautic excursion parameter data is not associated with a given weight capacity. Scoring function may be expressed as a risk function representing an "expected loss" of an algorithm relating inputs to outputs, where loss is computed as an error function representing a degree to which a prediction generated by the relation is incorrect when compared to a given input-output pair provided in corpus of aeronautic excursion data 300. Persons skilled in the art, upon reviewing the entirety of this disclosure, will be aware of various possible variations of supervised machine learning algorithms that may be used to determine relation between aeronautic excursion parameters and weight capacity. In an embodiment, one or more supervised machine-learning algorithms may be restricted to a particular domain; for instance, a supervised machine-learning process may be performed with respect to a given set of parameters and/or categories of parameters that have been suspected to be related to a given set of weight capacity. Domain restrictions may be suggested by experts and/or deduced from known purposes for particular evaluations and/or known tests used to evaluate weight capacity. Additional supervised learning processes may be performed without domain restrictions to detect, for instance, previously unknown and/or unsuspected relationships between aeronautic excursion parameters and weight capacity.

Still referring to FIG. 12, machine-learning algorithms may include unsupervised processes; unsupervised processes may, as a non-limiting example, be executed by an unsupervised learning module 1204 executing on at least a server 104 and/or on another computing device in communication with at least a server 104, which may include any hardware or software module. An unsupervised machine-learning process, as used herein, is a process that derives inferences in datasets without regard to labels; as a result, an unsupervised machine-learning process may be free to discover any structure, relationship, and/or correlation provided in the data. For instance, and without limitation, weight capacity learner 336 and/or at least a server 104 may perform an unsupervised machine learning process on corpus of aeronautic excursion data 300, which may cluster data of corpus of aeronautic excursion data 300 according to detected relationships between elements of the corpus of aeronautic excursion data 300, including without limitation correlations of elements of aeronautic excursion parameter data to each other and correlations of weight capacity data to each other; such relations may then be combined with supervised machine learning results to add new criteria for weight capacity learner 336 to apply in relating aeronautic excursion parameter data to weight capacity. Continuing the example a close correlation between first element of aeronautic excursion parameter data and second element of aeronautic excursion parameter data may indicate that the second element is also a good predictor for the weight capacity; second element may be included in a new supervised process to derive a relationship or may be used as a synonym or proxy for the first aeronautic excursion parameter by weight capacity learner 336.

Still referring to FIG. 12, at least a server 104 and/or weight capacity learner 336 may detect further significant categories of aeronautic parameters, relationships of such categories to weight capacity, and/or categories of weight capacity using machine-learning processes, including without limitation unsupervised machine-learning processes as described above. In an embodiment, as additional data is added to system 200, weight capacity learner 336 and/or at least a server 104 may continuously or iteratively perform unsupervised machine-learning processes to detect relationships between different elements of the added and/or overall data; in an embodiment, this may enable system 200 to use detected relationships to discover new correlations between aeronautic excursion parameters and weight capacity. Use of unsupervised learning may greatly enhance the accuracy and detail with which system may estimate weight capacity.

Still referring to FIG. 12, weight capacity learner 336 may produce a machine-learning model 1208. A "machine-learning model," as used herein, is a mathematical representation of a relationship between inputs and outputs, as generated using any machine-learning process including without limitation any process as described above, and stored in memory; an input is submitted to a machine-learning model once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model may be generated by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Alternatively or additionally, and still referring to FIG. 12, weight capacity learner 336 may be designed and configured to generate at least an output by executing a lazy learning process as a function of the corpus of aeronautic excursion data 300 and the at least a physiological test sample; lazy learning processes may be performed by a lazy learning module 1212 executing on at least a server 104 and/or on another computing device in communication with at least a server 104, which may include any hardware or software module. A lazy-learning process and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover a "first guess" or heuristic of weight capacity associated with at least an aeronautic excursion parameter, using corpus of aeronautic excursion data 300. Heuristic may include selecting some number of highest-ranking associations and/or weight capacity. Weight capacity learner 336 may alternatively or additionally implement any suitable "lazy learning" algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure.

In an embodiment, and still referring to FIG. 12, weight capacity learner 336 may operate by determining a current weight limit for an aeronautic excursion; current weight limit may be based on a fuel use datum representing a likely rate or total volume of fuel use on the aeronautic excursion based on current overall weight of the aircraft, as determined using aircraft data, an estimated weight of sapient payload, and an estimated weight of non-sapient payload. Each of these estimates may be calculated using any machine-learning algorithm as described above, in combination with training sets as described above. For instance, and without limitation, a training set correlating at least an aeronautic excursion parameter to a sapient payload weight datum may be used to determine an estimated sapient payload weight, by generating a machine-learning model such as a weight-capacity model and/or via a lazy learning process as described above; this may be performed, in addition, by combination with machine-learning processes estimating a likely enumeration of sapient payload using sapient payload enumeration entries correlating at least an aeronautic excursion parameter datum to a sapient payload enumeration on an aeronautic excursion. As a further example, a training set correlating at least an aeronautic excursion parameter to a non-sapient payload weight datum may be used to determine an estimated non-sapient payload weight, by generating a machine-learning model such as a weight-capacity model and/or via a lazy learning process as described above. Calculation of non-sapient weight capacity may be performed by comparison of two or more of the above-described values, including by subtraction of current overall weight from an overall weight capacity derived as described above to determine what excess weight capacity remains. One or more buffer amounts may be included in determination of excess non-sapient weight capacity; for instance, an error function as described above may indicate a degree of uncertainty in predicting non-sapient weight capacity, and calculation of non-sapient weight capacity may be performed by subtracting from the estimated non-sapient weight capacity an amount of weight equal or proportional to the degree of uncertainty as described above.

Referring again to FIG. 3, capacity estimation artificial intelligence module 220 may include a volume capacity learner 340, the volume capacity learner 340 designed and configured to determine a non-sapient payload volume capacity a function of the corpus of aeronautic excursion data 300 and the at least an aeronautic excursion parameter; this may be accomplished using any machine-learning algorithms as described above regarding weight capacity learner 336, or any combination thereof. As a nonlimiting example, volume capacity learner 340 may operate, without limitation, using non-sapient payload volume entries as described above in combination with machine-learning processes to generate an estimated non-sapient payload volume capacity using the at least an aeronautic excursion parameter.

Referring now to 13, machine-learning algorithms used by volume capacity learner 340 may include supervised machine-learning algorithms, which may, as a non-limiting example be executed using a supervised learning module 1300 executing on at least a server 104 and/or on another computing device in communication with at least a server 104, which may include any hardware or software module. Supervised machine learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may use aeronautic excursion parameters as inputs, volume capacity as outputs, and a scoring function representing a desired form of relationship to be detected between aeronautic excursion parameters and volume capacity; scoring function may, for instance, seek to maximize the probability that a given element of aeronautic excursion parameter data and/or combination of aeronautic excursion parameters is associated with a given volume capacity to minimize the probability that a given element of aeronautic excursion parameter data and/or combination of elements of aeronautic excursion parameter data is not associated with a given volume capacity. Scoring function may be expressed as a risk function representing an "expected loss" of an algorithm relating inputs to outputs, where loss is computed as an error function representing a degree to which a prediction generated by the relation is incorrect when compared to a given input-output pair provided in corpus of aeronautic excursion data 300. Persons skilled in the art, upon reviewing the entirety of this disclosure, will be aware of various possible variations of supervised machine learning algorithms that may be used to determine relation between aeronautic excursion parameters and volume capacity. In an embodiment, one or more supervised machine-learning algorithms may be restricted to a particular domain; for instance, a supervised machine-learning process may be performed with respect to a given set of parameters and/or categories of parameters that have been suspected to be related to a given set of volume capacity. Domain restrictions may be suggested by experts and/or deduced from known purposes for particular evaluations and/or known tests used to evaluate volume capacity. Additional supervised learning processes may be performed without domain restrictions to detect, for instance, previously unknown and/or unsuspected relationships between aeronautic excursion parameters and volume capacity.

Still referring to 13, machine-learning algorithms may include unsupervised processes; unsupervised processes may, as a non-limiting example, be executed by an unsupervised learning module 1304 executing on at least a server 104 and/or on another computing device in communication with at least a server 104, which may include any hardware or software module. An unsupervised machine-learning process, as used herein, is a process that derives inferences in datasets without regard to labels; as a result, an unsupervised machine-learning process may be free to discover any structure, relationship, and/or correlation provided in the data. For instance, and without limitation, volume capacity learner 340 and/or at least a server 104 may perform an unsupervised machine learning process on corpus of aeronautic excursion data 300, which may cluster data of corpus of aeronautic excursion data 300 according to detected relationships between elements of the corpus of aeronautic excursion data 300, including without limitation correlations of elements of aeronautic excursion parameter data to each other and correlations of volume capacity data to each other; such relations may then be combined with supervised machine learning results to add new criteria for volume capacity learner 340 to apply in relating aeronautic excursion parameter data to volume capacity. Continuing the example a close correlation between first element of aeronautic excursion parameter data and second element of aeronautic excursion parameter data may indicate that the second element is also a good predictor for the volume capacity; second element may be included in a new supervised process to derive a relationship or may be used as a synonym or proxy for the first aeronautic excursion parameter by volume capacity learner 340.

Still referring to 13, at least a server 104 and/or volume capacity learner 340 may detect further significant categories of aeronautic parameters, relationships of such categories to volume capacity, and/or categories of volume capacity using machine-learning processes, including without limitation unsupervised machine-learning processes as described above. In an embodiment, as additional data is added to system 200, volume capacity learner 340 and/or at least a server 104 may continuously or iteratively perform unsupervised machine-learning processes to detect relationships between different elements of the added and/or overall data; in an embodiment, this may enable system 200 to use detected relationships to discover new correlations between aeronautic excursion parameters and volume capacity. Use of unsupervised learning may greatly enhance the accuracy and detail with which system may estimate volume capacity.

Still referring to 13, volume capacity learner 340 may produce a machine-learning model 1220; alternatively or additionally volume capacity learner 340 may alternatively or additionally be designed and configured to generate at least an output by executing a lazy learning process as a function of the corpus of aeronautic excursion data 300 and the at least a physiological test sample; lazy learning processes may be performed by a lazy learning module 1308 executing on at least a server 104 and/or on another computing device in communication with at least a server 104, which may include any hardware or software module. A lazy-learning process and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover a "first guess" or heuristic of volume capacity associated with at least an aeronautic excursion parameter, using corpus of aeronautic excursion data 300. Heuristic may include selecting some number of highest-ranking associations and/or volume capacity. Volume capacity learner 340 may alternatively or additionally implement any suitable "lazy learning" algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure.

With continued reference to 13, volume capacity learner 340 may operate by determining a current volume limit for an aeronautic excursion; current volume limit may be based on current overall volume in the aircraft and/or in one or more storage compartments thereof, as determined using aircraft data and an estimated volume of non-sapient payload. Estimates may be calculated using any machine-learning algorithm as described above, in combination with training sets as described above. For instance, and without limitation, a training set correlating at least an aeronautic excursion parameter to a non-sapient payload volume datum may be used to determine an estimated non-sapient payload volume, by generating a machine-learning model such as a volume-capacity model and/or via a lazy learning process as described above. Calculation of non-sapient volume capacity may be performed by comparison of two or more of the above-described values, including by subtraction of current overall volume from an overall volume capacity derived as described above to determine what excess volume capacity remains. One or more buffer amounts may be included in determination of excess non-sapient volume capacity; for instance, an error function as described above may indicate a degree of uncertainty in predicting non-sapient volume capacity, and calculation of non-sapient volume capacity may be performed by subtracting from the estimated non-sapient volume capacity an amount of volume equal or proportional to the degree of uncertainty as described above.

Referring again to FIG. 3, capacity estimation artificial intelligence module 220 may include a sapient payload estimator 344, the sapient payload estimator 344 designed and configured to determine a sapient payload as a function of the corpus of aeronautic excursion data 300 and the at least an aeronautic excursion parameter; this may be accomplished using any machine-learning algorithms as described above regarding weight capacity learner 336, or any combination thereof. For instance, and without limitation, sapient payload estimator 344 may perform one or more machine-learning algorithms using training data containing at least a sapient payload enumeration entry of the plurality of sapient payload enumeration entries correlating at least an aeronautic excursion parameter datum to a sapient payload enumeration on an aeronautic excursion as described above.

Figure 14:
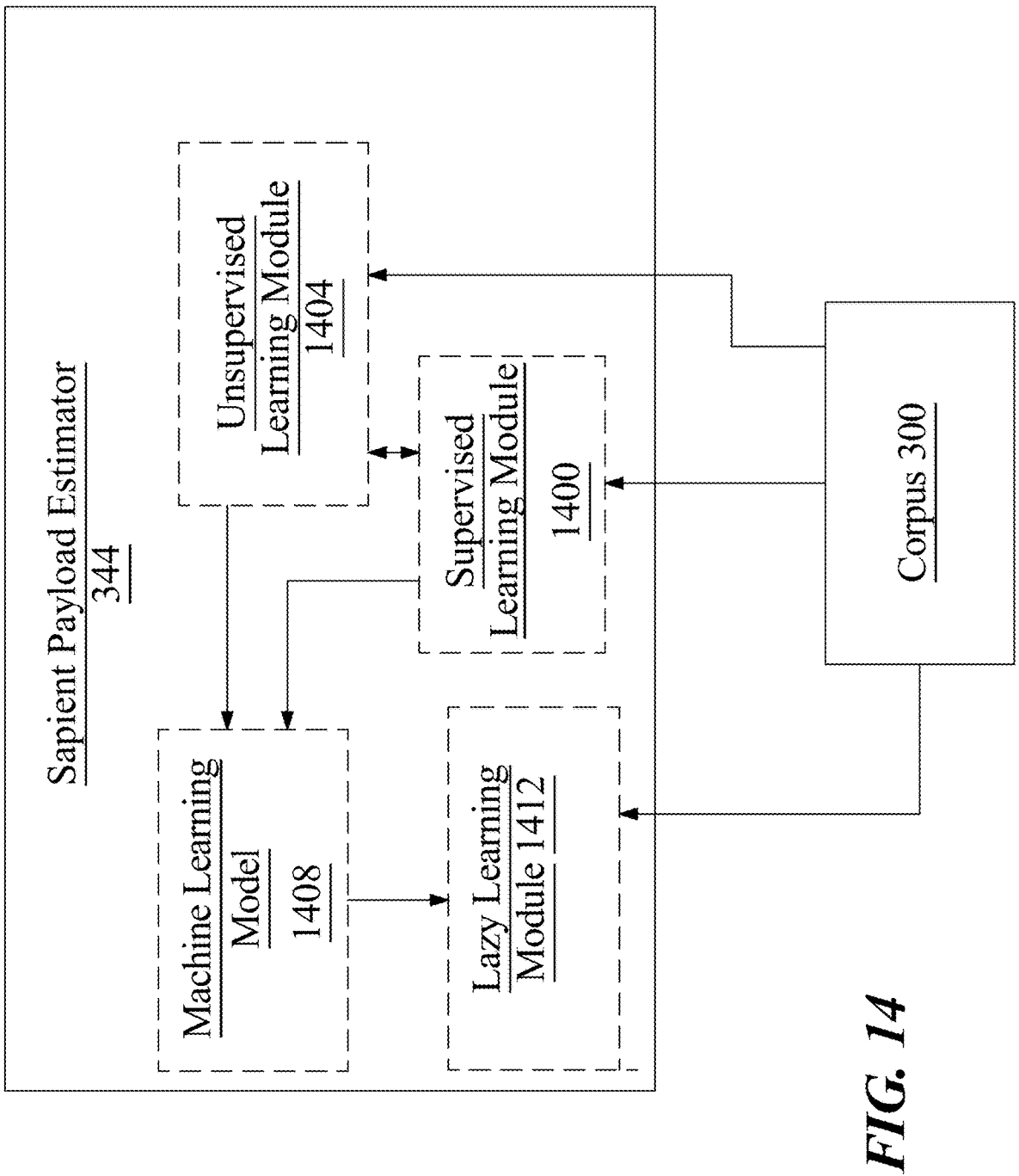
FIG. 14 is a block diagram of an exemplary embodiment of a sapient payload estimator.
Figure 15:
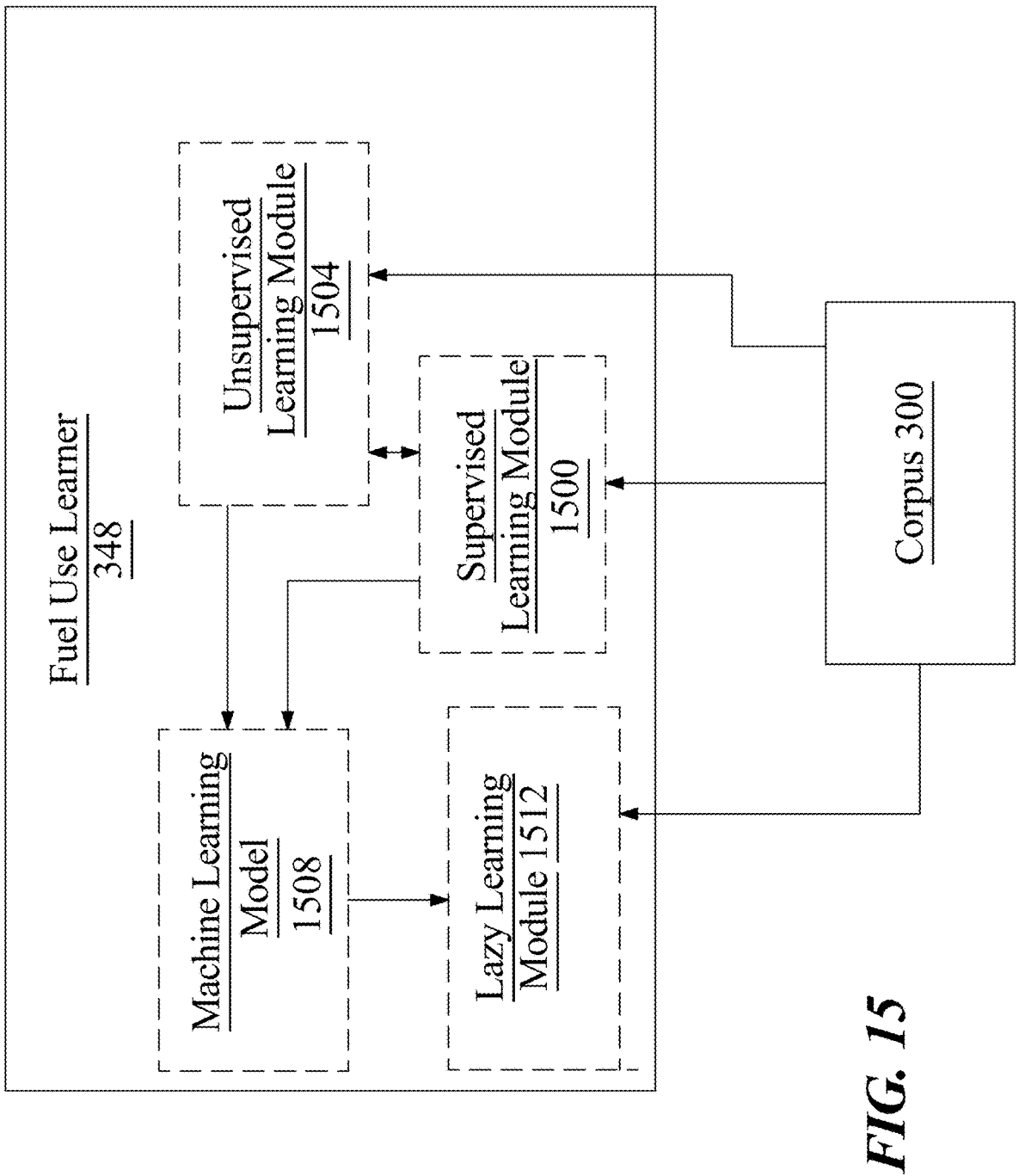
FIG. 15 is a block diagram of an exemplary embodiment of a fuel use learner.

Referring now to FIG. 14, machine-learning algorithms used by sapient payload estimator 344 may include supervised machine-learning algorithms, which may, as a non-limiting example be executed using a supervised learning module 1400 executing on at least a server 104 and/or on another computing device in communication with at least a server 104, which may include any hardware or software module. Supervised machine learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may use aeronautic excursion parameters as inputs, sapient payload and/or sapient payload enumerations as outputs, and a scoring function representing a desired form of relationship to be detected between aeronautic excursion parameters and sapient payloads and/or enumerations; scoring function may, for instance, seek to maximize the probability that a given element of aeronautic excursion parameter data and/or combination of aeronautic excursion parameters is associated with a given sapient payload and/or enumeration, and/or to minimize the probability that a given element of aeronautic excursion parameter data and/or combination of elements of aeronautic excursion parameter data is not associated with a given sapient payload and/or enumeration. Scoring function may be expressed as a risk function representing an "expected loss" of an algorithm relating inputs to outputs, where loss is computed as an error function representing a degree to which a prediction generated by the relation is incorrect when compared to a given input-output pair provided in corpus of aeronautic excursion data 300. Persons skilled in the art, upon reviewing the entirety of this disclosure, will be aware of various possible variations of supervised machine learning algorithms that may be used to determine relation between aeronautic excursion parameters and sapient payloads and/or enumerations. In an embodiment, one or more supervised machine-learning algorithms may be restricted to a particular domain; for instance, a supervised machine-learning process may be performed with respect to a given set of parameters and/or categories of parameters that have been suspected to be related to a given set of sapient payloads and/or enumerations. Additional supervised learning processes may be performed without domain restrictions to detect, for instance, previously unknown and/or unsuspected relationships between aeronautic excursion parameters and sapient payloads and/or enumerations.

Still referring to 14, machine-learning algorithms may include unsupervised processes; unsupervised processes may, as a non-limiting example, be executed by an unsupervised learning module 1404 executing on at least a server 104 and/or on another computing device in communication with at least a server 104, which may include any hardware or software module. An unsupervised machine-learning process, as used herein, is a process that derives inferences in datasets without regard to labels; as a result, an unsupervised machine-learning process may be free to discover any structure, relationship, and/or correlation provided in the data. For instance, and without limitation, sapient payload estimator 344 and/or at least a server 104 may perform an unsupervised machine learning process on corpus of aeronautic excursion data 300, which may cluster data of corpus of aeronautic excursion data 300 according to detected relationships between elements of the corpus of aeronautic excursion data 300, including without limitation correlations of elements of aeronautic excursion parameter data to each other and correlations of sapient payload data to each other; such relations may then be combined with supervised machine learning results to add new criteria for sapient payload estimator 344 to apply in relating aeronautic excursion parameter data to sapient payloads and/or enumerations. Continuing the example a close correlation between first element of aeronautic excursion parameter data and second element of aeronautic excursion parameter data may indicate that the second element is also a good predictor for a sapient payload and/or enumeration; second element may be included in a new supervised process to derive a relationship or may be used as a synonym or proxy for the first aeronautic excursion parameter by sapient payload estimator 344.

Still referring to 14, at least a server 104 and/or sapient payload estimator 344 may detect further significant categories of aeronautic parameters, relationships of such categories to sapient payloads and/or enumerations, and/or categories of sapient payloads and/or enumerations using machine-learning processes, including without limitation unsupervised machine-learning processes as described above. In an embodiment, as additional data is added to system 200, sapient payload estimator 344 and/or at least a server 104 may continuously or iteratively perform unsupervised machine-learning processes to detect relationships between different elements of the added and/or overall data; in an embodiment, this may enable system 200 to use detected relationships to discover new correlations between aeronautic excursion parameters and sapient payload. Use of unsupervised learning may greatly enhance the accuracy and detail with which system may estimate sapient payload.

Still referring to 14, sapient payload estimator 344 may produce a machine-learning model 1408; alternatively or additionally sapient payload estimator 344 may alternatively or additionally be designed and configured to generate at least an output by executing a lazy learning process as a function of the corpus of aeronautic excursion data 300 and the at least a physiological test sample; lazy learning processes may be performed by a lazy learning module 1412 executing on at least a server 104 and/or on another computing device in communication with at least a server 104, which may include any hardware or software module. A lazy-learning process and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover a "first guess" or heuristic of sapient payload associated with at least an aeronautic excursion parameter, using corpus of aeronautic excursion data 300. Heuristic may include selecting some number of highest-ranking associations and/or sapient payload. Sapient payload estimator 344 may alternatively or additionally implement any suitable "lazy learning" algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Referring again to FIG. 3, capacity estimation artificial intelligence may include a fuel use learner 348 configured to relate at least an aeronautic excursion parameter datum to a fuel use datum as a function of the corpus of aeronautic excursion data 300; this may be accomplished using any machine-learning algorithms as described above regarding weight capacity learner 336, or any combination thereof. For instance, and without limitation, fuel user learner may perform one or more machine-learning algorithms using training data containing a plurality of fuel use entries, each fuel use entry of the plurality of fuel use entries correlating at least an aeronautic excursion parameter datum to a fuel use datum.

Referring now to 15, machine-learning algorithms used by fuel use learner 348 may include supervised machine-learning algorithms, which may, as a non-limiting example be executed using a supervised learning module 1500 executing on at least a server 104 and/or on another computing device in communication with at least a server 104, which may include any hardware or software module. Supervised machine learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may use aeronautic excursion parameters as inputs, fuel use data as outputs, and a scoring function representing a desired form of relationship to be detected between aeronautic excursion parameters and fuel use; scoring function may, for instance, seek to maximize the probability that a given element of aeronautic excursion parameter data and/or combination of aeronautic excursion parameters is associated with a given rate or overall volume of fuel use to minimize the probability that a given element of aeronautic excursion parameter data and/or combination of elements of aeronautic excursion parameter data is not associated with a given rate or volume of fuel use. Scoring function may be expressed as a risk function representing an "expected loss" of an algorithm relating inputs to outputs, where loss is computed as an error function representing a degree to which a prediction generated by the relation is incorrect when compared to a given input-output pair provided in corpus of aeronautic excursion data 300. Persons skilled in the art, upon reviewing the entirety of this disclosure, will be aware of various possible variations of supervised machine learning algorithms that may be used to determine relation between aeronautic excursion parameters and fuel use data. In an embodiment, one or more supervised machine-learning algorithms may be restricted to a particular domain; for instance, a supervised machine-learning process may be performed with respect to a given set of parameters and/or categories of parameters that have been suspected to be related to a given set of fuel use. Additional supervised learning processes may be performed without domain restrictions to detect, for instance, previously unknown and/or unsuspected relationships between aeronautic excursion parameters and fuel use data.

Still referring to 15, machine-learning algorithms may include unsupervised processes; unsupervised processes may, as a non-limiting example, be executed by an unsupervised learning module 1504 executing on at least a server 104 and/or on another computing device in communication with at least a server 104, which may include any hardware or software module. An unsupervised machine-learning process, as used herein, is a process that derives inferences in datasets without regard to labels; as a result, an unsupervised machine-learning process may be free to discover any structure, relationship, and/or correlation provided in the data. For instance, and without limitation, fuel use learner 348 and/or at least a server 104 may perform an unsupervised machine learning process on corpus of aeronautic excursion data 300, which may cluster data of corpus of aeronautic excursion data 300 according to detected relationships between elements of the corpus of aeronautic excursion data 300, including without limitation correlations of elements of aeronautic excursion parameter data to each other and correlations of fuel use data to each other; such relations may then be combined with supervised machine learning results to add new criteria for fuel use learner 348 to apply in relating aeronautic excursion parameter data to fuel use data. Continuing the example a close correlation between first element of aeronautic excursion parameter data and second element of aeronautic excursion parameter data may indicate that the second element is also a good predictor for the fuel use; second element may be included in a new supervised process to derive a relationship or may be used as a synonym or proxy for the first aeronautic excursion parameter by fuel use learner 348.

Still referring to 15, at least a server 104 and/or fuel use learner 348 may detect further significant categories of aeronautic parameters, relationships of such categories to fuel use data, and/or categories of fuel use data using machine-learning processes, including without limitation unsupervised machine-learning processes as described above. In an embodiment, as additional data is added to system 200, fuel use learner 348 and/or at least a server 104 may continuously or iteratively perform unsupervised machine-learning processes to detect relationships between different elements of the added and/or overall data; in an embodiment, this may enable system 200 to use detected relationships to discover new correlations between aeronautic excursion parameters and fuel use data. Use of unsupervised learning may greatly enhance the accuracy and detail with which system may estimate fuel use data.

Still referring to 15, fuel use learner 348 may produce a machine-learning model 1508; alternatively or additionally fuel use learner 348 may alternatively or additionally be designed and configured to generate at least an output by executing a lazy learning process as a function of the corpus of aeronautic excursion data 300 and the at least a physiological test sample; lazy learning processes may be performed by a lazy learning module 1512 executing on at least a server 104 and/or on another computing device in communication with at least a server 104, which may include any hardware or software module. A lazy-learning process and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover a "first guess" or heuristic of fuel use associated with at least an aeronautic excursion parameter, using corpus of aeronautic excursion data 300. Heuristic may include selecting some number of highest-ranking associations and/or fuel use. Fuel use learner 348 may alternatively or additionally implement any suitable "lazy learning" algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Referring again to FIG. 3, at least a server 104 may be designed and/or configured to output an excess non-sapient payload storage estimation based on the at least an aeronautic excursion parameter. Outputting an excess non-sapient payload storage estimation may include, without limitation directly providing the excess non-sapient payload storage estimation to a user and/or remote device (not shown); provision to a user may be accomplished, without limitation, via a graphical user interface 332 as described above. Outputting an excess non-sapient payload storage estimation may also be performed by using the excess non-sapient payload storage estimation to enforce limits on permitted and/or accepted freight requests as described above.

Referring now to 15, an exemplary embodiment of an artificial intelligence method 2480 of estimating excess non-sapient payload capacity on mixed-payload aeronautic excursions is illustrated. At step 1605, at least a server 104 produces a corpus of mixed payload aeronautic excursion data including a plurality of aeronautic excursion data entries, where each aeronautic excursion data entry 304 correlates at least a first aeronautic excursion parameter datum 308 and at least a second aeronautic excursion parameter datum 312; this may be accomplished, without limitation, as described above in reference to FIGS. 1-16. As a non-limiting example, producing corpus of aeronautic excursion data 300 may include producing a plurality of sapient payload-to-weight entries, each sapient payload-to-weight entry of the plurality of sapient payload-to-weight entries correlating at least an aeronautic excursion parameter datum to a sapient payload weight datum, for instance as described above in reference to FIGS. 1-16. As a further non-limiting example, producing the corpus of aeronautic excursion data 300 may include producing a plurality of sapient payload enumeration entries, each sapient payload enumeration entry of the plurality of sapient payload enumeration entries correlating at least an aeronautic excursion parameter datum to a sapient payload enumeration on an aeronautic excursion, for instance as described above in reference to FIGS. 1-16. As an additional non-limiting example, producing corpus of aeronautic excursion data 300 may include producing a plurality of sapient payload-to-weight entries, each sapient payload-to-weight entry of the plurality of non-sapient payload-to-weight entries correlating at least an aeronautic excursion parameter datum to a non-sapient payload weight datum, for instance as described above in reference to FIGS. 1-16. As another example, producing corpus of aeronautic excursion data 300 may include producing a plurality of non-sapient payload volume entries, each non-sapient volume entry of the plurality of sapient payload-to-weight entries correlating at least an aeronautic excursion parameter datum to non-sapient payload volume datum, for instance as described above in reference to FIGS. 1-16. As a further non-limiting example, producing corpus of aeronautic excursion data 300 may include producing a plurality of fuel use entries, each fuel use entry of the plurality of fuel use entries correlating at least an aeronautic excursion parameter datum to a fuel use datum, for instance as described above in reference to FIGS. 1-13.

At step 1610, and still referring to 16, at least a server 104 receives at least an aeronautic excursion parameter regarding at least a future aeronautic excursion. This may be accomplished, without limitation, as described above in reference to FIGS. 1-16; for instance, and without limitation, receiving at least an aeronautic excursion parameter may include receiving the at least an aeronautic excursion parameter from an aeronautic vehicle operator, which may be accomplished via an operator data feed 316 as described above. As a further non-limiting example, receiving at least an aeronautic excursion parameter from an airport, which may be accomplished via an airport data feed 320 as described above. As an additional non-limiting example, receiving at least an aeronautic excursion parameter may include receiving the at least an aeronautic excursion parameter from a weather forecasting apparatus, such as via a weather data feed 324 as described above. As a further non-limiting example, receiving at least an aeronautic excursion parameter may include receiving at least a freight-use request; this may be accomplished as described above in reference to FIGS. 1-16, including without limitation via a graphical user interface 332.

At step 1615, and continuing to refer to 15, a capacity estimation artificial intelligence module 220 operating on the at least a server 104 generates an excess non-sapient payload storage estimation as a function of the corpus of aeronautic excursion data 300 and the at least an aeronautic excursion parameter; this may be accomplished, without limitation, as described above in reference to FIGS. 1-16. For instance and without limitation, where at least a server 104 receives at least a freight-use request, generating excess non-sapient payload storage estimation may include modifying the at least an excess non-sapient payload storage estimation based on the freight-use request.

Still referring to 16, in an embodiment, at least a future aeronautic excursion may include a first excursion section from a first airport to a second airport and a second excursion section from a second airport to a third airport; for instance, and without limitation, at least a future aeronautic excursion may have a first "leg" to a first destination outputting the at least an excess non-sapient payload storage estimation further comprises outputting a first estimation for the first excursion section and a second estimation for the second excursion section. Capacity estimation artificial intelligence module 220 may generate each excess non-sapient payload storage estimation for each excursion section using any method or method steps as described above for generation of an excess non-sapient payload storage estimation.

At step 1600, and still referring to 16, at least a server 104 outputs at least an excess non-sapient payload storage estimation based on the at least an aeronautic excursion parameter; this may be implemented as described above in reference to FIGS. 1-16. In an embodiment, at least a server 104 receives at least a freight-use request and modifies the at least an excess non-sapient payload storage estimation based on the freight-use request; this may be implemented as described above in reference to FIGS. 1-16. As a non-limiting example, where the at least a future aeronautic excursion further includes a first excursion section from a first airport to a second airport and a second excursion section from a second airport to a third airport, outputting the at least an excess non-sapient payload storage estimation may include outputting a first estimation for the first excursion section and a second estimation for the second excursion section; at least a freight-use request may include a first freight-use request corresponding to the first excursion section and a second freight-use request corresponding to the second excursion section, where each of the first freight-use request and the second freight-use request may be entered and/or processed as described above for entering a freight-use request. As a further non-limiting example, where receiving the at least an aeronautic excursion parameter regarding at least a future aeronautic excursion further includes receiving at least a first aeronautic excursion parameter regarding at least a first future aeronautic excursion and receiving at least a second aeronautic excursion parameter regarding at least a second future aeronautic excursion, outputting the at least an excess non-sapient payload storage estimation may include outputting at least a first excess non-sapient payload storage estimation as a function of the at least a first aeronautic excursion parameter and outputting at least a second excess non-sapient payload estimation as a function of the at least a second aeronautic excursion parameter; at least a server 104 may receive at least a freight-use request including at least a first freight-use request for the at least a first future aeronautic excursion and at least a second freight-use request for the at least a second future aeronautic excursion.

Figure 16:
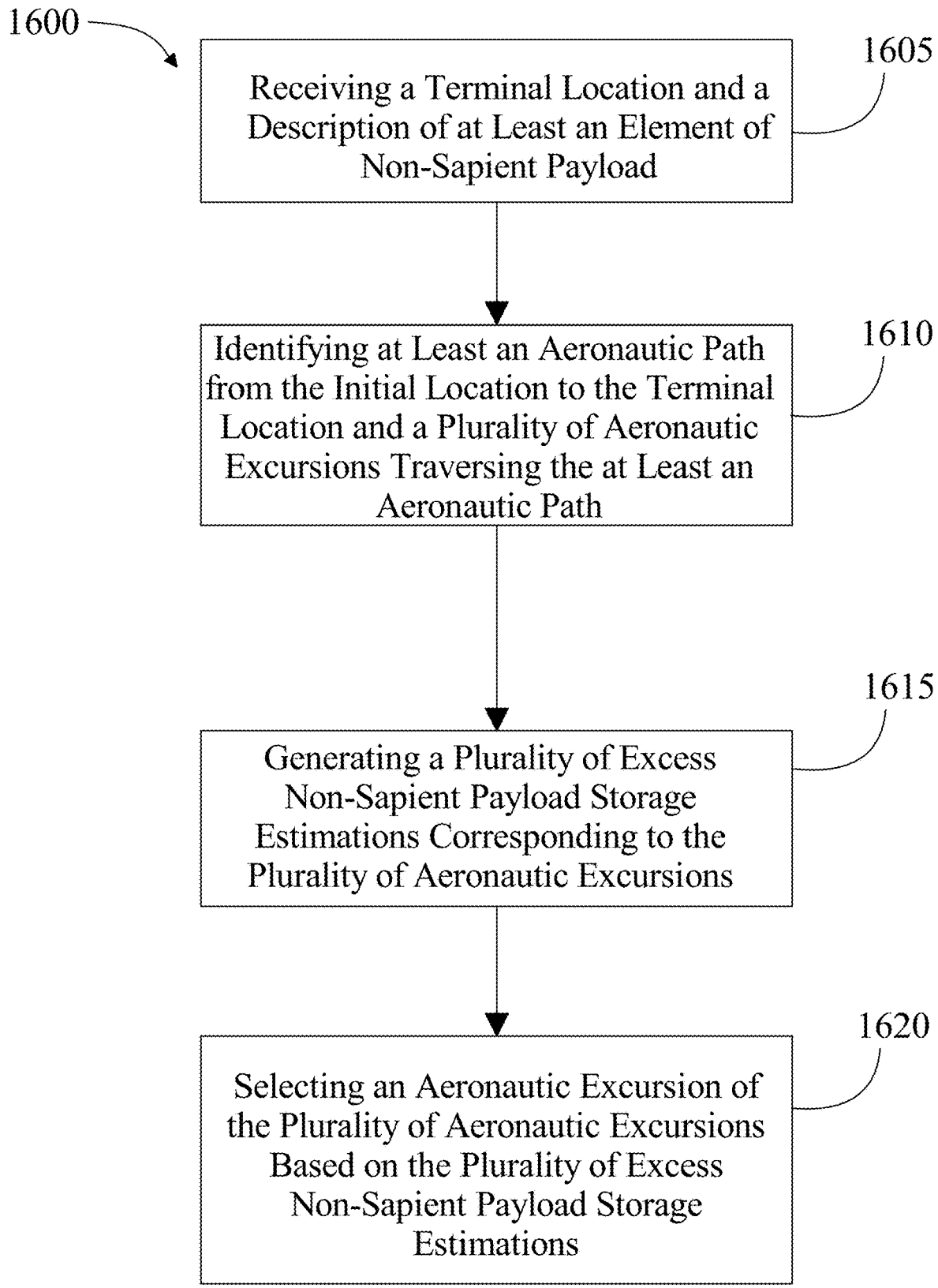
FIG. 16 is a flow chart illustrating an exemplary embodiment of a method of selection of physical asset transfer paths using mixed-payload aeronautic excursions.

Turning now to FIG. 16, a method 1600 of method of selection of physical asset transfer paths using mixed-payload aeronautic excursions. At step 1605, at least a server 104 receives an initial location, a terminal location, and a description of at least an element of non-sapient payload; this may be implemented, without limitation, as described above in reference to FIGS. 1-16. At step 1610, at least a server 104 identifies at least an aeronautic path from the initial location to the terminal location and a plurality of aeronautic excursions traversing the at least an aeronautic path; this may be implemented, without limitation, as described above in reference to FIGS. 1-16. At step 1615, at least a server 104 generates a plurality excess non-sapient payload storage estimations corresponding to the plurality of aeronautic excursions; this may be implemented, without limitation, as described above in reference to FIGS. 1-16. At step 1620, at least a server 104 selects an aeronautic excursion of the plurality of aeronautic excursions based on the plurality of excess non-sapient payload storage estimations; this may be implemented, without limitation, as described above in reference to FIGS. 1-16.

Figure 17:
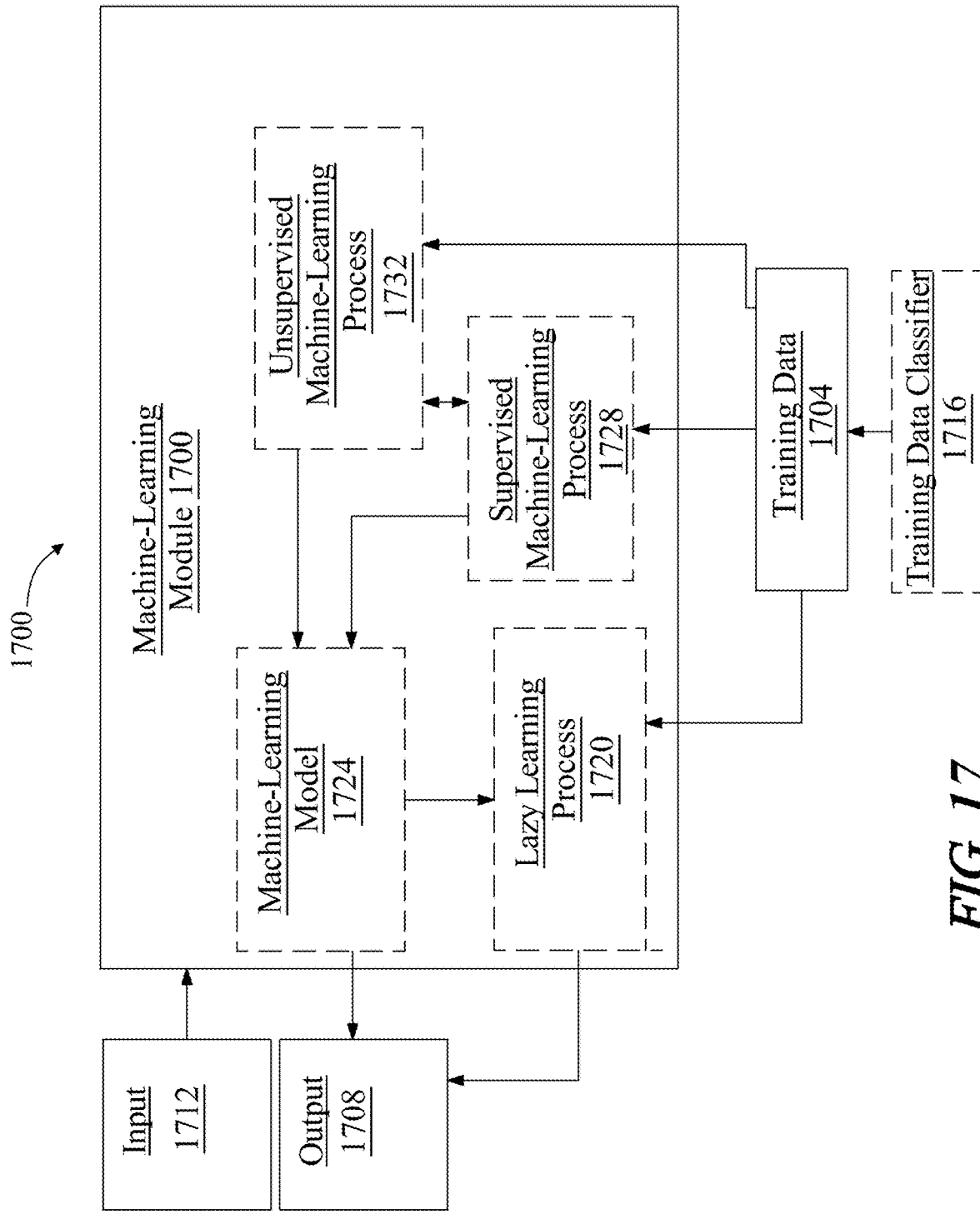
FIG. 17 is a block diagram of an exemplary machine-learning process.

Referring now to FIG. 17, an exemplary embodiment of a machine-learning module 1700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1704 to generate an algorithm that will be performed by a computing device/module to produce outputs 1708 given data provided as inputs 1712; this is in contrast to a non-machine learning software program where the commands to be executed are determined in advance by a user and written in a programming language.

Still referring to FIG. 17, "training data," as used herein, is data containing correlations that a machine-learning process may use to model relationships between two or more categories of data elements. For instance, and without limitation, training data 1704 may include a plurality of data entries, each entry representing a set of data elements that were recorded, received, and/or generated together; data elements may be correlated by shared existence in a given data entry, by proximity in a given data entry, or the like. Multiple data entries in training data 1704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1704 according to various correlations; correlations may indicate causative and/or predictive links between categories of data elements, which may be modeled as relationships such as mathematical relationships by machine-learning processes as described in further detail below. Training data 1704 may be formatted and/or organized by categories of data elements, for instance by associating data elements with one or more descriptors corresponding to categories of data elements. As a non-limiting example, training data 1704 may include data entered in standardized forms by persons or processes, such that entry of a given data element in a given field in a form may be mapped to one or more descriptors of categories. Elements in training data 1704 may be linked to descriptors of categories by tags, tokens, or other data elements; for instance, and without limitation, training data 1704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 17, training data 1704 may include one or more elements that are not categorized; that is, training data 1704 may not be formatted or contain descriptors for some elements of data. Machine-learning algorithms and/or other processes may sort training data 1704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1704 to be made applicable for two or more distinct machine-learning algorithms as described in further detail below. Training data 1704 used by machine-learning module 1700 may correlate any input data as described in this disclosure to any output data as described in this disclosure.

Further referring to FIG. 17, training data may be filtered, sorted, and/or selected using one or more supervised and/or unsupervised machine-learning processes and/or models as described in further detail below; such models may include without limitation a training data classifier 1716. Training data classifier 1716 may include a "classifier," which as used in this disclosure is a machine-learning model as defined below, such as a mathematical model, neural net, or program generated by a machine learning algorithm known as a "classification algorithm," as described in further detail below, that sorts of inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1700 may generate a classifier using a classification algorithm, defined as a processes whereby a computing device and/or any module and/or component operating thereon derives a classifier from training data 1704. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 17, machine-learning module 1700 may be configured to perform a lazy-learning process 1720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1704. Heuristic may include selecting some number of highest-ranking associations and/or training data 1704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 17, machine-learning processes as described in this disclosure may be used to generate machine-learning models 1724. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 1724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1724 may be generated by creating an artificial neural network, such as a convolutional neural network comprising an input layer of nodes, one or more intermediate layers, and an output layer of nodes. Connections between nodes may be created via the process of "training" the network, in which elements from a training data 1704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 17, machine-learning algorithms may include at least a supervised machine-learning process 1728. At least a supervised machine-learning process 1728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include an order 108, an initial location 112, a terminal location 116, aeronautic paths 124, and the like as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1704. Persons skilled in the art, upon reviewing the entirety of this disclosure, will be aware of various possible variations of at least a supervised machine-learning process 1728 that may be used to determine relation between inputs and outputs. Supervised machine-learning processes may include classification algorithms as defined above.

Further referring to FIG. 17, machine learning processes may include at least an unsupervised machine-learning processes 1732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 17, machine-learning module 1700 may be designed and configured to create a machine-learning model 1724 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 17, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

For example, and still referring to FIG. 17, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 17, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Figure 18:
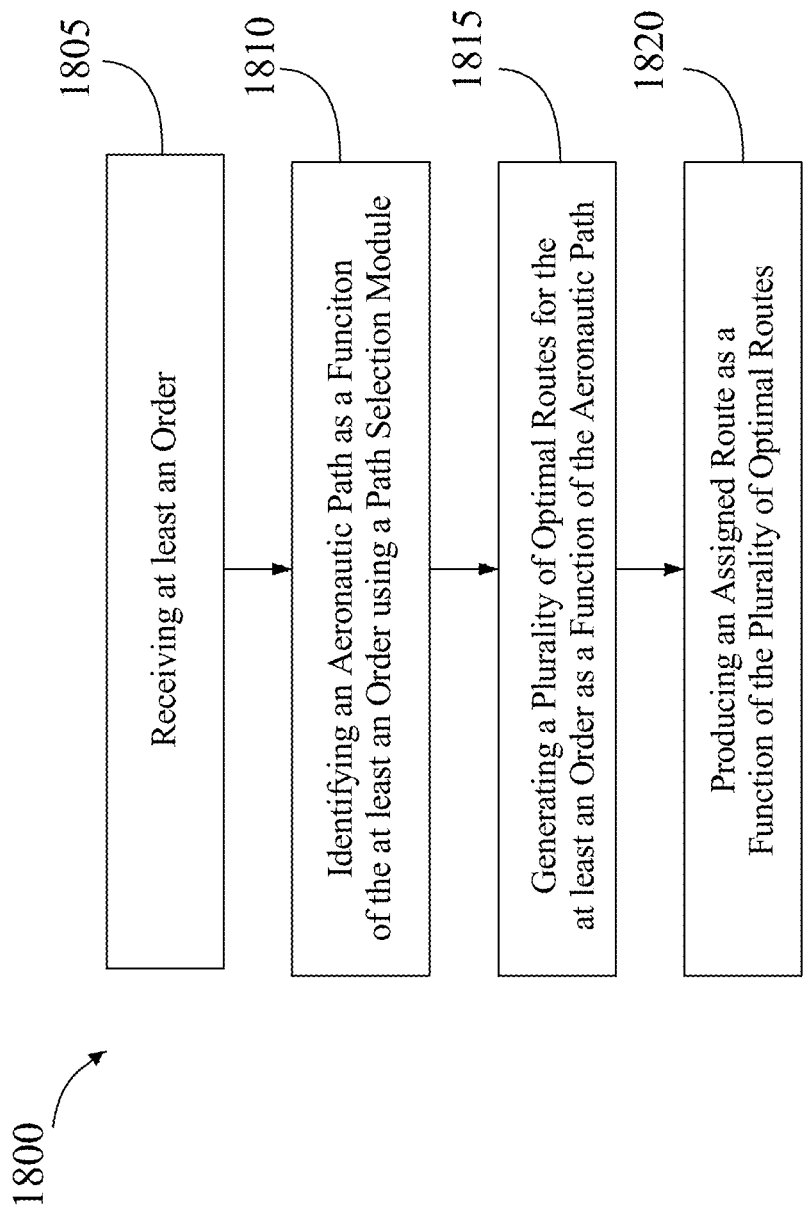
FIG. 18 is a flow chart illustrating an exemplary embodiment of a method of use for aeronautic path optimization.

Referring to FIG. 18, an exemplary method 1800 for aeronautic path optimization. Method 1800 includes a step 805, of receiving, using at least a server, at least an order, wherein the order comprises data regarding the physical transport of a non-sapient payload from an initial location to a terminal location. This may occur as described above in reference to FIGS. 1-18. In an embodiment, the at least a server may further be configured to classify initial location and a terminal location to a geographic centroid using a centroid classifier. In another embodiment, the order maybe transported using an aeronautic excursion.

With continued reference to FIG. 18, method 1800 includes a step 1810, of identifying, using the at least a server, an aeronautic path as a function of the at least an order using a path selection module, wherein the aeronautic path comprises travel between the initial location and the terminal location. This may occur as described above in reference to FIGS. 1-18. In an embodiment, a aeronautic path may be configured to transport the order between the initial location and a geographic centroid. In another embodiment, the aeronautic path additionally is configured to transport the order between a geographic centroid and the terminal location. The geographic centroid may be comprised of a plurality of centroids. The aeronautic path may be configured to transport the order using a mixed payload flight With continued reference to FIG. 18, method 1800 includes a step 1815, of generating, using the at least a server, a plurality of optimal routes for the at least an order as a function of the aeronautic path. This may occur as described above in reference to FIGS. 1-18. In an embodiment, the optimal route maybe generated using an optimization machine learning model. In another embodiment, am optimal route ranking may be generated as a function of the optimized route.

With continued reference to FIG. 18, method 1800 includes a step 1820, of producing, using the at least a server, an assigned route as a function of the plurality of optimal routes. This may occur as described above in reference to FIGS. 1-18.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 19:
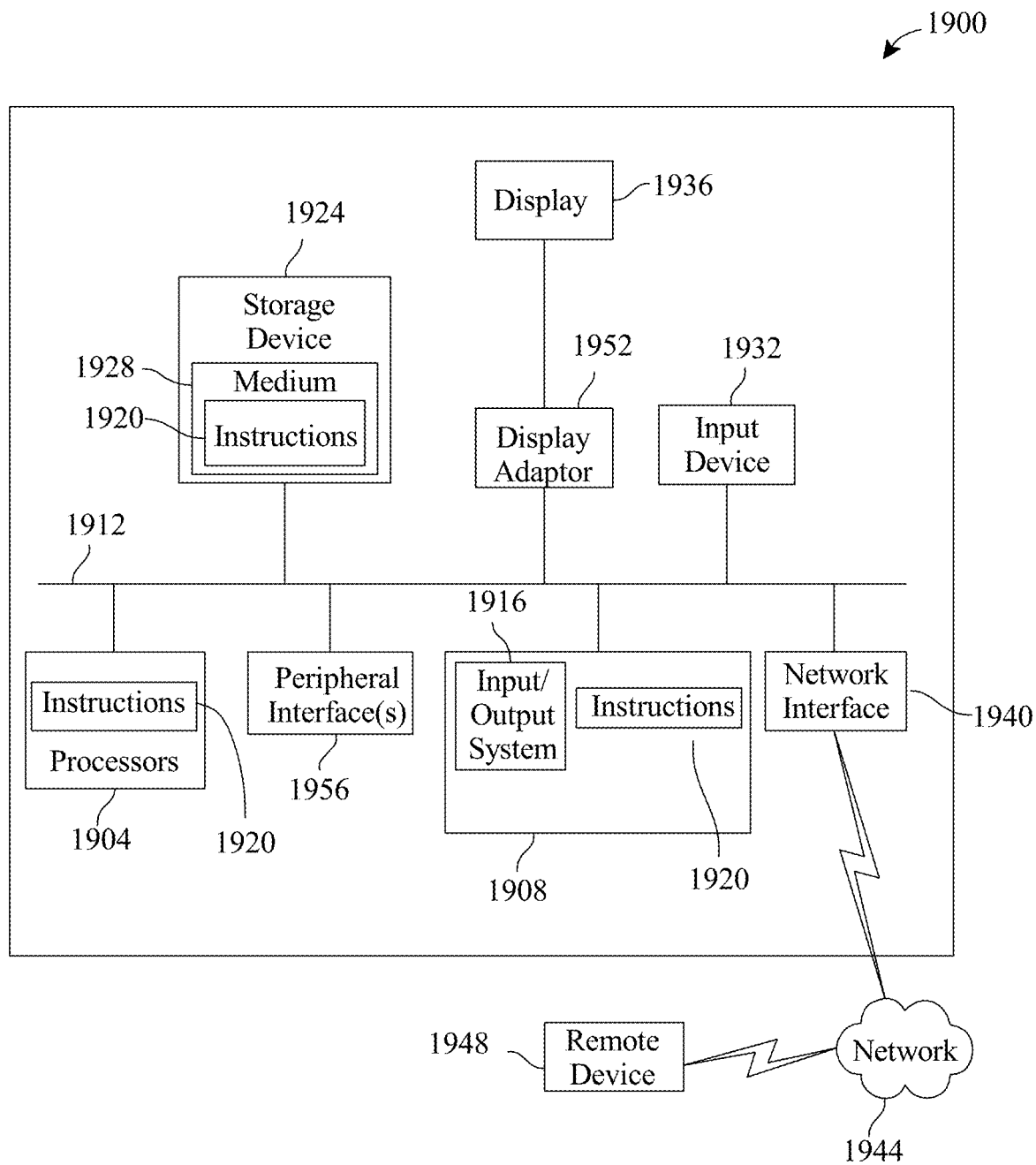
FIG. 19 is a block diagram of a computing system that can be used to implement any one or more of the methodologies disclosed herein and any one or more portions thereof.

FIG. 19 shows a diagrammatic representation of one embodiment of a computing device in the exemplary form of a computer system 1900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1900 includes a processor 1904 and a memory 1908 that communicate with each other, and with other components, via a bus 1912. Bus 1912 may include any of several types of bus structures including, but not limited to, a memory bus, a memory controller, a peripheral bus, a local bus, and any combinations thereof, using any of a variety of bus architectures.

Processor 1904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1904 may be organized according to Von Neumann and/or Harvard architecture as a non-limiting example. Processor 1904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 1908 may include various components (e.g., machine-readable media) including, but not limited to, a random-access memory component, a read only component, and any combinations thereof. In one example, a basic input/output system 1916 (BIOS), including basic routines that help to transfer information between elements within computer system 1900, such as during start-up, may be stored in memory 1908. Memory 1908 may also include (e.g., stored on one or more machine-readable media) instructions (e.g., software) 1920 embodying any one or more of the aspects and/or methodologies of the present disclosure. In another example, memory 1908 may further include any number of program modules including, but not limited to, an operating system, one or more application programs, other program modules, program data, and any combinations thereof.

Computer system 1900 may also include a storage device 1924. Examples of a storage device (e.g., storage device 1924) include, but are not limited to, a hard disk drive, a magnetic disk drive, an optical disc drive in combination with an optical medium, a solid-state memory device, and any combinations thereof. Storage device 1924 may be connected to bus 1912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1924 (or one or more components thereof) may be removably interfaced with computer system 1900 (e.g., via an external port connector (not shown)). Particularly, storage device 1924 and an associated machine-readable medium 1928 may provide nonvolatile and/or volatile storage of machine-readable instructions, data structures, program modules, and/or other data for computer system 1900. In one example, software 1920 may reside, completely or partially, within machine-readable medium 1928. In another example, software 1920 may reside, completely or partially, within processor 1904.

Computer system 1900 may also include an input device 1932. In one example, a user of computer system 1900 may enter commands and/or other information into computer system 1900 via input device 1932. Examples of an input device 1932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1932 may be interfaced to bus 1912 via any of a variety of interfaces (not shown) including, but not limited to, a serial interface, a parallel interface, a game port, a USB interface, a FIREWIRE interface, a direct interface to bus 1912, and any combinations thereof. Input device 1932 may include a touch screen interface that may be a part of or separate from display 1936, discussed further below. Input device 1932 may be utilized as a user selection device for selecting one or more graphical representations in a graphical interface as described above.

A user may also input commands and/or other information to computer system 1900 via storage device 1924 (e.g., a removable disk drive, a flash drive, etc.) and/or network interface device 1940. A network interface device, such as network interface device 1940, may be utilized for connecting computer system 1900 to one or more of a variety of networks, such as network 1944, and one or more remote devices 1948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1944, may employ a wired and/or a wireless mode of communication. In general, any network topology may be used. Information (e.g., data, software 1920, etc.) may be communicated to and/or from computer system 1900 via network interface device 1940.

Computer system 1900 may further include a video display adapter 1952 for communicating a displayable image to a display device, such as display device 1936. Examples of a display device include, but are not limited to, a liquid crystal display (LCD), a cathode ray tube (CRT), a plasma display, a light emitting diode (LED) display, and any combinations thereof. Display adapter 1952 and display device 1936 may be utilized in combination with processor 1904 to provide graphical representations of aspects of the present disclosure. In addition to a display device, computer system 1900 may include one or more other peripheral output devices including, but not limited to, an audio speaker, a printer, and any combinations thereof. Such peripheral output devices may be connected to bus 1912 via a peripheral interface 1956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for aeronautic path optimization, the system comprising:
    at least a server, wherein the at least a server is configured to:
        receive at least an order, wherein the at least an order comprises data regarding a physical transport of a non-sapient payload from an initial location to a terminal location;
        identify an aeronautic path as a function of the at least an order using a path selection module, wherein the aeronauticoath comprises travel between the initial location and the terminal location;
        generate a plurality of optimal routes for the at least an order as a function of the aeronautic path, wherein generating the plurality of optimal routes comprises:
            creating optimization training data correlating a plurality of aeronautic path data elements to a plurality of optimal route data elements by:
                linking data from a plurality of feeds using hierarchies of data structures to assemble the optimization training data; and
                storing the optimization training data in a database;
            receiving the optimization training data from the database;
            training an optimization machine learning model as a function of the optimization training data using a machine learning process; and
            generating the plurality of optimal routes as a function of the aeronautic path using the trained optimization machine learning model; and
        produce an assigned route as a function the plurality of optimal routes.

2. The system of claim 1, wherein the aeronauticoath is configured to transport the at least an order between the initial location and a geographic centroid.

3. The system of claim 2, wherein the aeronauticath additionally is further configured to transport the at least an order between the geographic centroid and the terminal location.

4. The system of claim 1, wherein the aeronauticoath is configured to transport the at least an order between a first geographic centroid and a second geographic centroid.

5. The system of claim 1, wherein the aeronauticoath is configured to transport the at least an order using a mixed payload flight.

6. The system of claim 1, wherein the at least a server is further configured to classify the initial location to a geographic centroid as a function of a centroid classifier.

7. The system of claim 1, wherein the at least a server is further configured to classify the terminal location to a geographic centroid as a function of a centroid classifier.

8. The system of claim 1, wherein the at least an order is transported using an aeronautic excursion.

9. The system of claim 1, wherein an optimal route ranking is generated as a function of the plurality of optimal routes.

10. A method for aeronautic path optimization, the method comprising:
    receiving, using at least a server, at least an order, wherein the at least an order comprises data regarding a physical transport of a non-sapient payload from an initial location to a terminal location;
    identifying, using the at least a server, an aeronautic path as a function of the at least an order using a path selection module, wherein the aeronauticoath comprises travel between the initial location and the terminal location;
    generating, using the at least a server, a plurality of optimal routes for the at least an order as a function of the aeronauticoath, wherein generating the plurality of optimal routes comprises:
        creating optimization training data correlating a plurality of aeronautic path data elements to a plurality of optimal route data elements by:
            linking data from a plurality of feeds using hierarchies of data structures to assemble the optimization training data; and
            storing the optimization training data in a database;
        receiving the optimization training data from the database;
        training an optimization machine learning model as a function of the optimization training data using a machine learning process; and
        generating the plurality of optimal routes as a function of the aeronauticapath using the trained optimization machine learning model; and
    producing, using the at least a server, an assigned route as a function of the plurality of optimal routes.

11. The method of claim 10, wherein the aeronauticath is configured to transport the at least an order between the initial location and a geographic centroid.

12. The method of claim 11, wherein the aeronauticoath is further configured to transport the at least an order between the geographic centroid and the terminal location.

13. The method of claim 12, wherein the aeronauticoath is configured to transport the at least an order between a first geographic centroid and a second geographic centroid.

14. The method of claim 10, wherein the aeronauticoath is configured to transport the at least an order using a mixed payload flight.

15. The method of claim 10, further comprising classifying, using the at least a server, the initial location to a geographic centroid as a function of a centroid classifier.

16. The method of claim 11, further comprising classifying, using the at least a server, the terminal location to a geographic centroid as a function of a centroid classifier.

17. The method of claim 11, wherein the at least an order is transported using an aeronautic excursion.

18. The method of claim 10, wherein an optimal route ranking is generated as a function of the plurality of optimal routes.

* * * * *